US012741589B2

(12) United States Patent
McCarthy et al.

(10) Patent No.: US 12,741,589 B2
(45) Date of Patent: Sep. 22, 2026

(54) TACTILE ENERGY GENERATION BASED ON VEHICLE SIGNALS

(71) Applicant: Ford Global Technologies, LLC, Dearborn, MI (US)

(72) Inventors: Mark McCarthy, Ann Arbor, MI (US); Alexander Petniunas, Canton, MI (US); Jason Konopa, Clawson, MI (US); John Marshall Dodson, II, Ann Arbor, MI (US); Mark Lynn Clapper, Ann Arbor, MI (US); Brian Zellers, Farmington Hills, MI (US); Alan Robert Dona, Huntington Woods, MI (US); Jonathan Hair, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 18/630,868

(22) Filed: Apr. 9, 2024

(65) Prior Publication Data

US 2025/0313150 A1 Oct. 9, 2025

(51) Int. Cl.
*B60Q 9/00* (2006.01)

(52) U.S. Cl.
CPC .................................... *B60Q 9/00* (2013.01)

(58) Field of Classification Search
None
See application file for complete search history.

(56) References Cited

U.S. PATENT DOCUMENTS 6,947,893 B1 * 9/2005 Iwaki .................... G10L 19/018 704/E19.009
9,292,983 B2 3/2016 Luke et al.
10,766,499 B2 9/2020 Mergl et al.
10,906,557 B1 * 2/2021 Aunkst .................. B60L 50/60
11,192,420 B2 12/2021 Anderson et al.
11,639,182 B2 5/2023 Aunkst et al.
11,731,609 B2 * 8/2023 Fukao .................. F02D 41/022 701/22
2005/0218856 A1 * 10/2005 Okano .................. B60T 8/4077 318/638
2013/0090795 A1 * 4/2013 Luke ...................... B60L 53/68 701/22
2022/0072960 A1 3/2022 Oh et al.
2022/0089085 A1 3/2022 Oh et al.
(Continued)

FOREIGN PATENT DOCUMENTS

KR 102504336 B1 3/2023

*Primary Examiner* — James M Mcpherson
(74) *Attorney, Agent, or Firm* — McCoy Russell LLP

(57) ABSTRACT

Methods and systems are provided for generation of lower-frequency tactile energy (e.g., vibration) of a vehicle system based on different signals. In one example, a method may include: acquiring an audio signal from an audio source and, responsive to acquiring the audio signal, generating a first motor input command for a first traction motor driving a wheel of a vehicle system; acquiring a vehicle tactile feedback signal from the vehicle system and, responsive to acquiring the vehicle tactile feedback signal, generating a second motor input command for the first traction motor; and acquiring a drive signal from a controller of a vehicle and, responsive to acquiring the drive signal, generating a third motor input command for the first traction motor.

20 Claims, 9 Drawing Sheets

(56) References Cited

U.S. PATENT DOCUMENTS

| | | | | |
|---|---|---|---|---|
| 2023/0090814 | A1* | 3/2023 | Murase | B60L 15/20 701/22 |
| 2023/0166757 | A1* | 6/2023 | Cannon | B60W 10/08 701/22 |
| 2023/0191913 | A1* | 6/2023 | Shimode | B60L 7/18 701/22 |
| 2023/0294662 | A1* | 9/2023 | Kim | B60Q 5/008 701/36 |
| 2023/0318501 | A1* | 10/2023 | Yamamoto | H02P 23/04 701/22 |
| 2024/0116369 | A1 | 4/2024 | McCarthy et al. | |
| 2024/0182041 | A1* | 6/2024 | Laine | B60C 99/006 |
| 2025/0249925 | A1* | 8/2025 | Reynaga | B60K 35/25 |

* cited by examiner

TACTILE ENERGY GENERATION BASED ON VEHICLE SIGNALS

FIELD

The present description relates generally to methods and systems for controlling traction motors of a vehicle to generate tactile energy in the vehicle.

BACKGROUND/SUMMARY

Recent customer research has revealed that customers spend a significant amount of time in 'stationary moments' where the vehicle is occupied but not moving. Customers leverage these moments for work, rest, and play. One example element provides customers with enhanced entertainment options that has the potential to make the vehicle the preferred location, for example, relative to a home space. While modern automotive audio systems may provide a robust acoustic environment, available vibrational response provided by subwoofers of an automotive audio system may be less than is desired to enhance an overall experience. By comparison, movie theaters and video gaming systems may use mass-based shakers to provide lower-frequency tactile energy. Additionally, there is increased demand and interest in auxiliary tactile feedback experiences in the vehicle during stationary moments and dynamic moments (e.g., where the vehicle is moving). Auxiliary tactile feedback may include vibrations of one or more areas of a cabin of the vehicle, elements of the vehicle such as door handles and steering wheels, and other movement of the vehicle (e.g., vertical bobbing/nodding of the vehicle) that correspond with behaviors of the vehicle and/or other user entertainment options. However, these systems may have packaging space and resource demands which make them inefficient to implement in a vehicle.

Attempts to address vehicle motion (e.g., vibration) as a function of an audio system of the vehicle include inducing vibration of localized parts of the vehicle and inducing vibration using vehicle suspension systems. One example approach is shown by Mergl et al. in U.S. Pat. No. 10,766,499. Therein, systems and methods for controlling vibration units and use of vibration units of a vehicle system are described. The vehicle system includes a vehicle passenger holding system having at least one vibration unit which is configured and disposed to generate vibrations perceptible for a passenger of a motor vehicle, based on real current drive parameters of the motor vehicle. The vibration unit preferably has an electric rotational motor and the vibration unit may be cushion-integrated to generate local vibrations in the designated passenger location, e.g., the passenger supporting element as a whole is not moved. Further, in some embodiments, real drive parameters are directly converted into a control signal suitable for controlling the vibration units, which in this case may also be at the same time as the control signal.

Another example approach is shown by Anderson et al. in U.S. Pat. No. 11,192,420. Therein, a method of operating a vehicle with an active suspension system is described, wherein the method includes playing at least one of video and audio within the vehicle, and operating at least one actuator of the active suspension system to induce motion in at least a portion of the vehicle, wherein at least one aspect of the induced motion is synchronized with at least one aspect of the video and/or audio. For example, the active suspension system of the vehicle may perform as a subwoofer of a music system. An audio source may produce an electronic audio signal that is received by a filter, which acts as a low pass filter and provides low frequency content of the audio signal to the active suspension system. In some embodiments, the active suspension system produces low frequency vibration in the vehicle body in response to this filtered audio signal by using one or more suspension system actuators. Examples of such actuators may include electro-hydraulic, electromagnetic and electro-mechanical actuators.

However, the inventors herein have recognized potential issues with such systems. As one example, the system described by Anderson et al. is directed to using an active suspension system of a vehicle to produce low frequency vibration, however it may be desirable to use a different system to produce low frequency vibration when the vehicle is lacking an active suspension system or lacking a robust active suspension system capable of producing low frequency vibration. The system described by Mergl et al. is directed to generating localized vibrations in a vehicle cushion based on driving conditions. It may be desirable to generate full-vehicle vibrations when the vehicle is stationary based on audio sources internal to the vehicle (e.g., a video/videogame/music source as opposed to driving condition sensors). For example, full-vehicle vibration may include vibration of a cab, a suspension system, a body, and a frame of a vehicle system, as opposed to regions of the cab and/or vehicle, such as a passenger position. It is further desirable to provide enhanced tactile feedback to the vehicle during dynamic and stationary operation of the vehicle that may be triggered by a signal other than an audio signal.

In one example, the issues described above may be addressed by a method for a vehicle, comprising: acquiring an audio signal from an audio source and, responsive to acquiring the audio signal, generating a first motor input command for a first traction motor driving a wheel of a vehicle system; acquiring a vehicle tactile feedback signal from the vehicle system and, responsive to acquiring the vehicle tactile feedback signal, generating a second motor input command for the first traction motor; and acquiring a drive signal from a controller of a vehicle and, responsive to acquiring the drive signal, generating a third motor input command for the first traction motor. In this way, vibration (e.g., lower-frequency tactile energy) of the vehicle system may be generated in response to acquiring different types of signals to provide different user experiences while additionally or alternatively using the traction motor to drive directional motion of the vehicle. This may enhance a user experience using existing drivetrain and vehicle elements without decreasing an amount of torque being provided to drive directional motion of the vehicle.

As one example, the method uses existing battery electric vehicle (BEV) traction motor hardware, such as traction motors used to propel the vehicle. A BEV traction motor may have a fast reaction time to torque, even at zero speed. Thus, an expected reaction time of a vibration system (e.g., to produce lower-frequency tactile energy) may be fast. Potential lag between a motor input command and a vibrational output by the traction motor may occur as motor mounts and suspension bushings react to torque. The resultant vibrational force may shake the vehicle system, as opposed to a single or multiple designated passenger locations. In this way, all passengers of the vehicle may experience the tactile energy. Additionally, a realism of the entertainment experience (e.g., audio, video, video game, and so on) may be enhanced above that of a traditional movie theater and/or gaming chair shaker-based systems by movement of a vehicle system. Using existing hardware of a battery electric vehicle (BEV) to provide lower-frequency tactile energy (e.g., vibration) to the vehicle system may enhance an entertainment experience (e.g., video, audio, video game, and so on) during 'stationary moments' without increasing a complexity, a packaging space (e.g., mass), and/or a complexity of the automotive audio system. The tactile energy experience applied to the vehicle system may be coordinated with video, music, video games, other audio sources, and so on to provide a vibrational response for the vehicle system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a block diagram of a control system for a vehicle, such as the vehicle of

FIG. 1.

DETAILED DESCRIPTION

Figure 4:
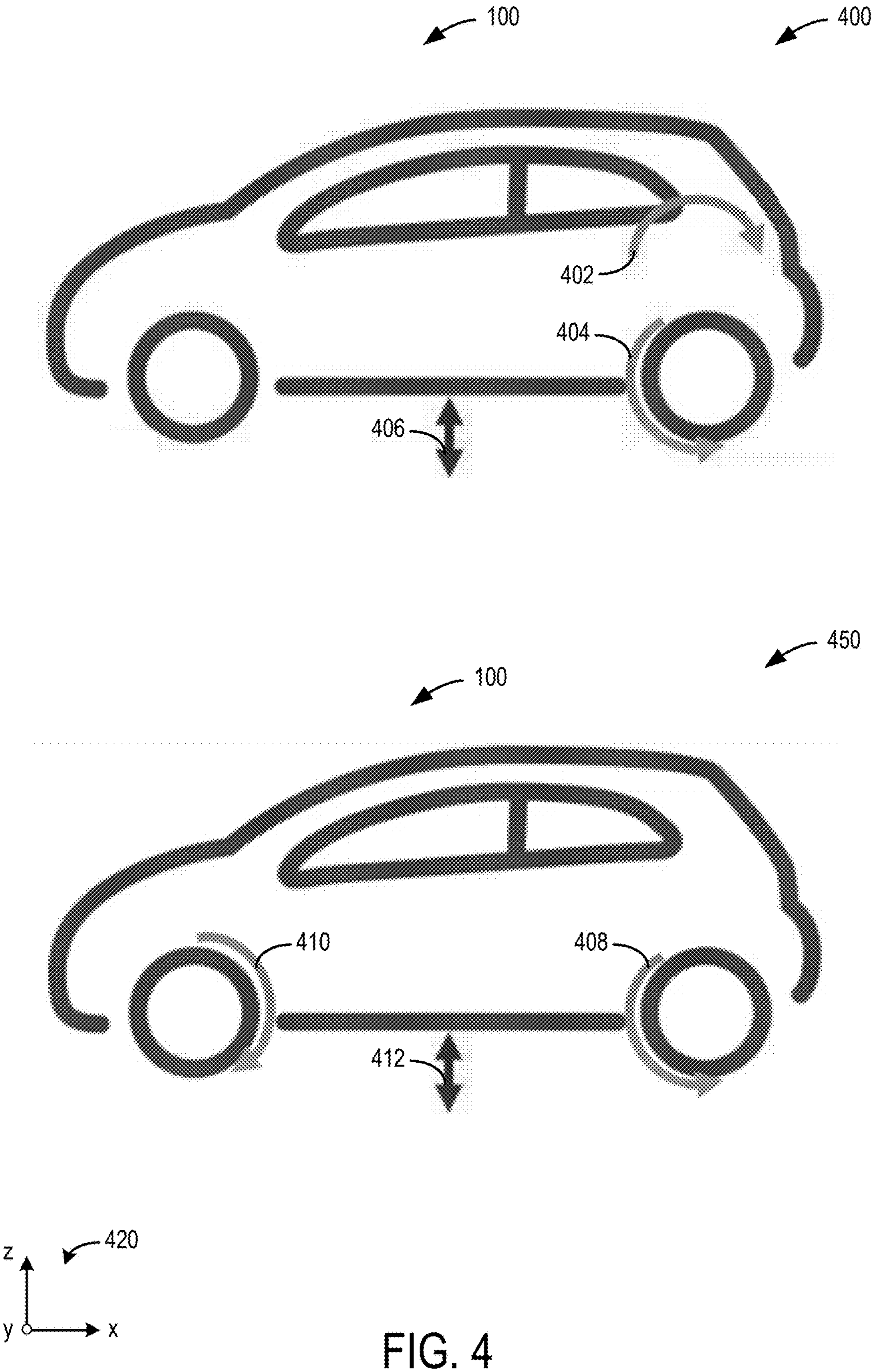
FIG. 4 shows schematic diagrams indicating a first distribution of motor torque and a second distribution of motor torque in different vehicle configurations.
Figure 5:
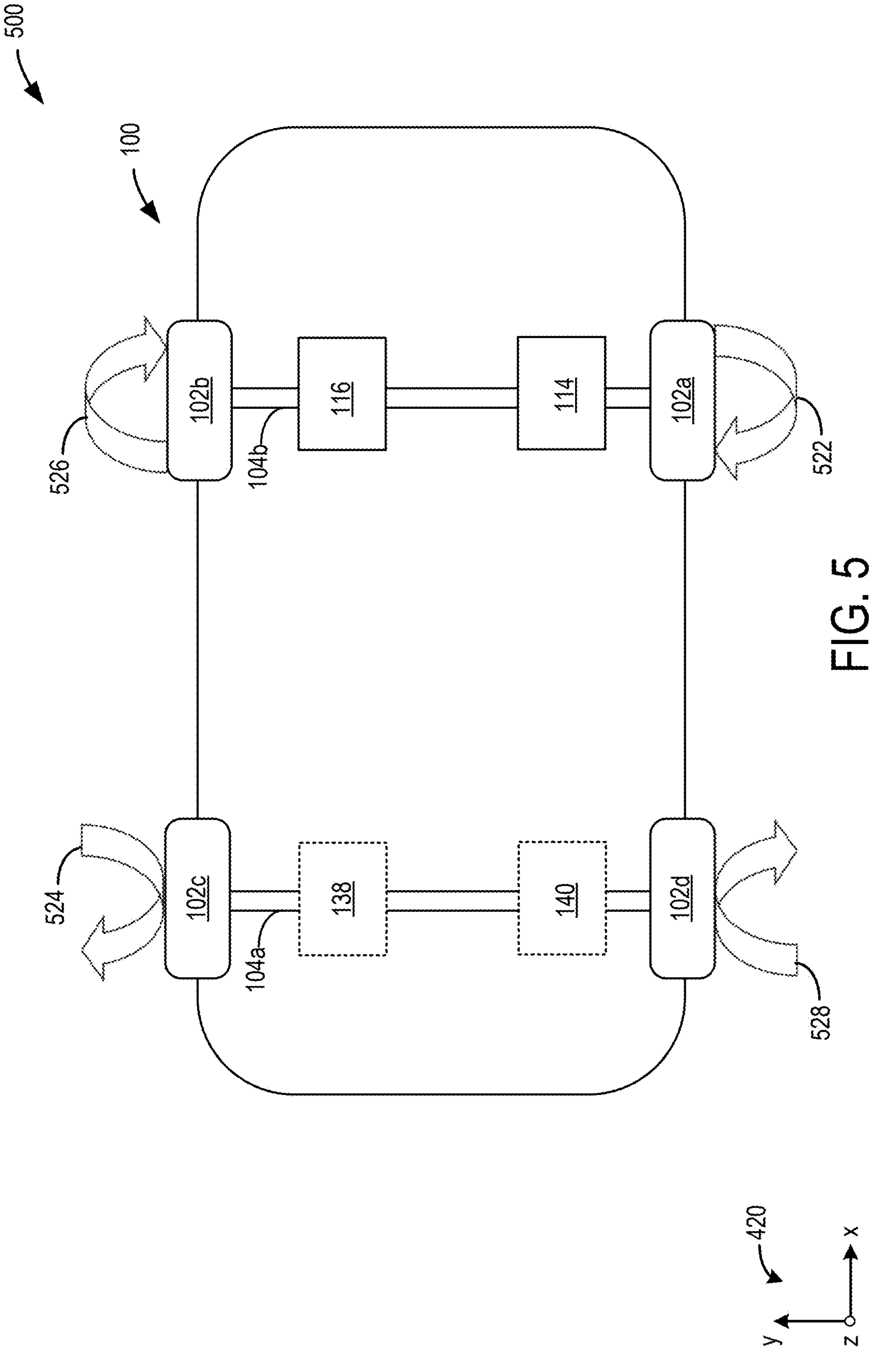
FIG. 5 shows a schematic diagram indicating a third distribution of motor torque in a vehicle.
Figure 6:
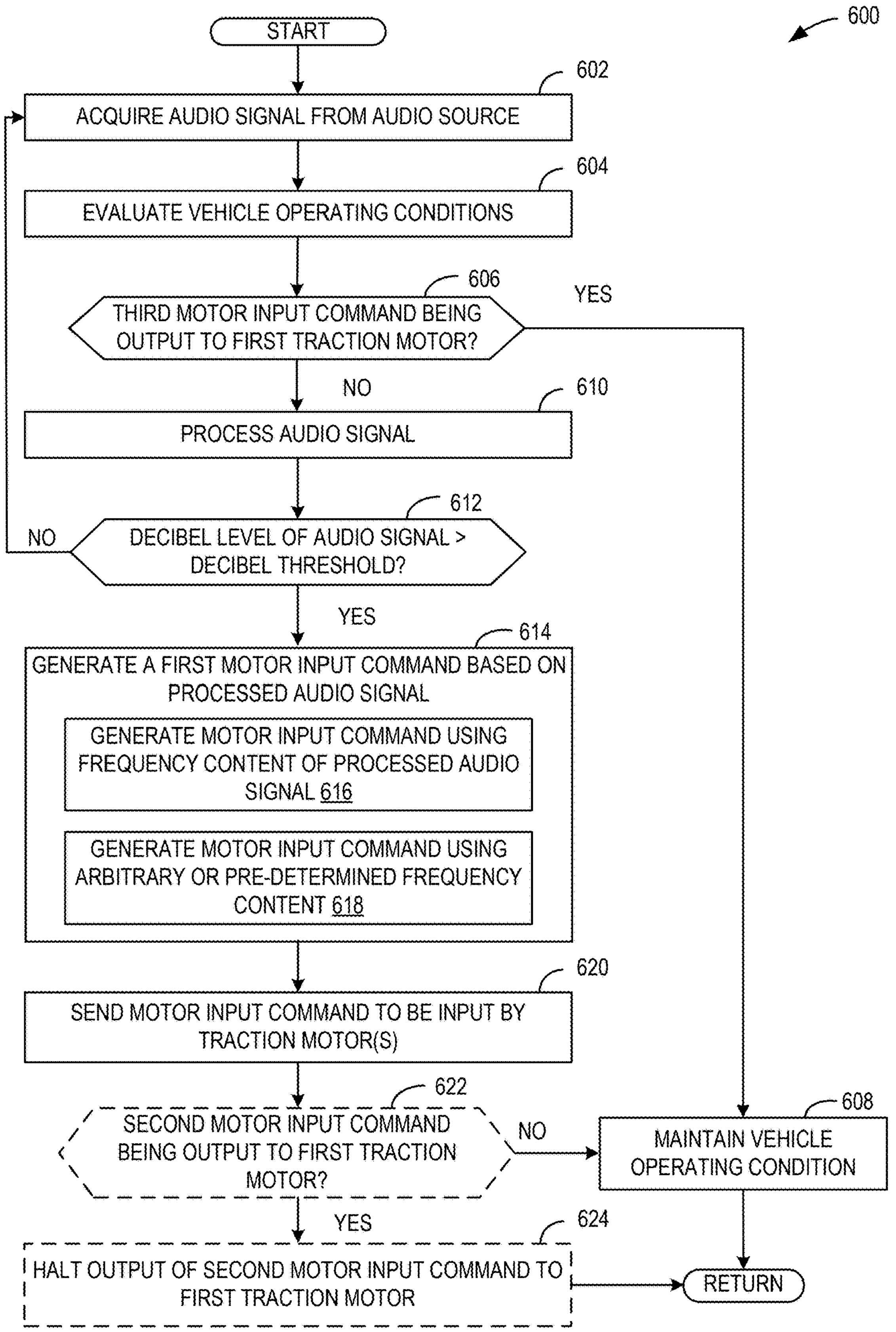
FIG. 6 illustrates a method for generating a motor input command from an audio signal of an audio source.
Figure 7:
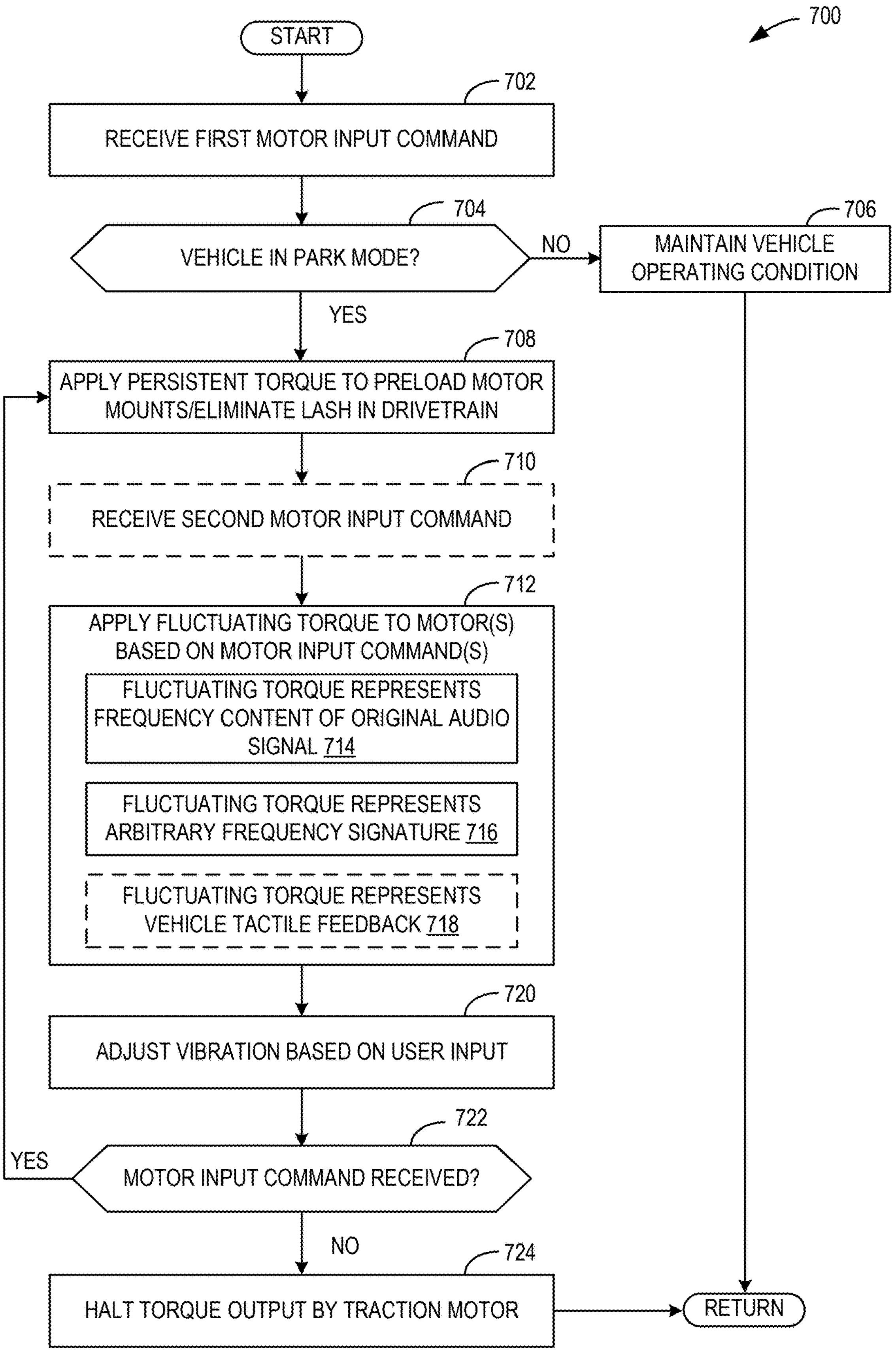
FIG. 7 illustrates a method for implementing a motor input command to generate lower-frequency tactile energy in a vehicle using a traction motor.
Figure 8:
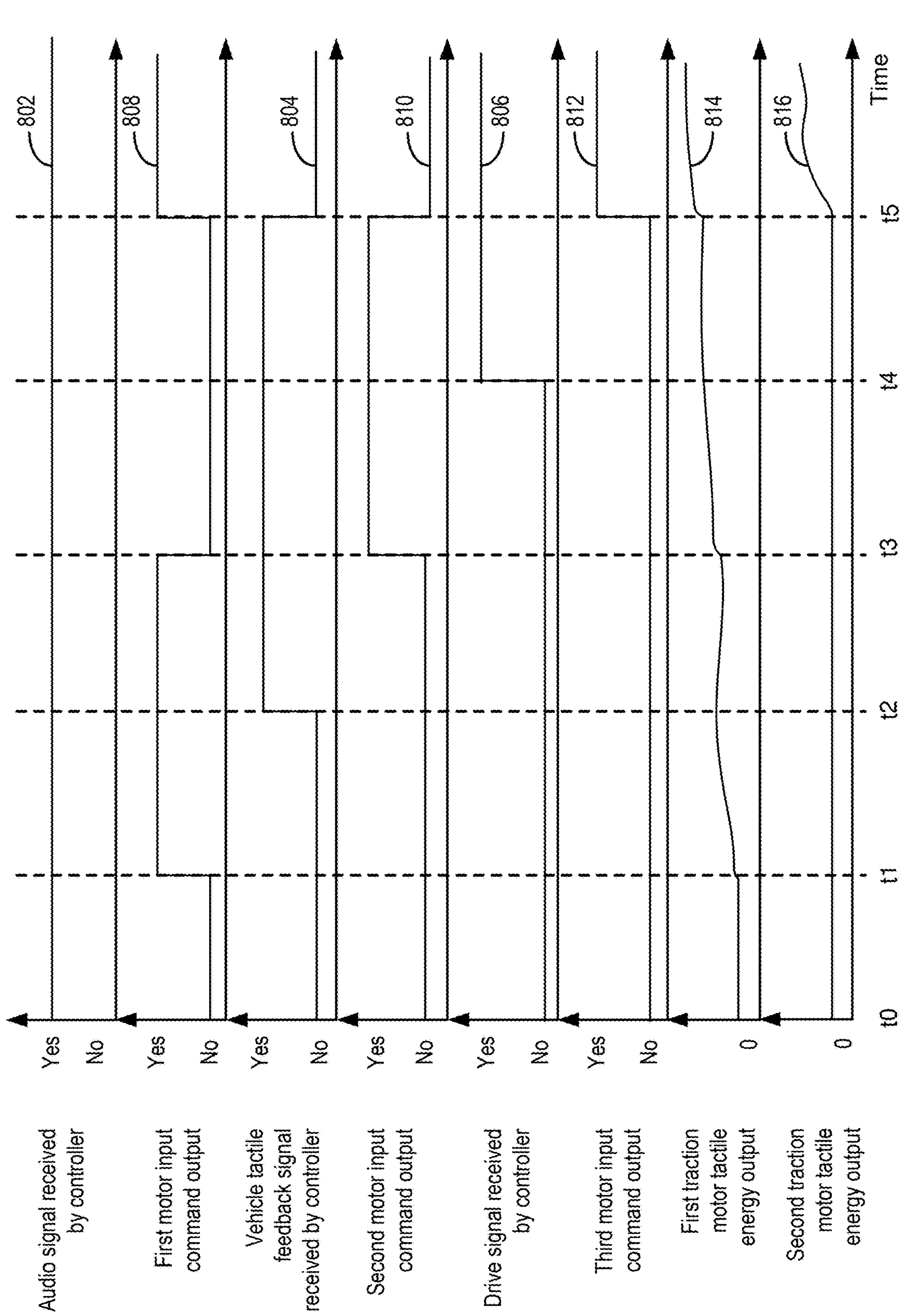
FIG. 8 shows a timing diagram illustrating generation and output of motor input command in response to receiving different signals, and corresponding power output of traction motors.

The following description relates to systems and methods for generating tactile feedback for a vehicle, using one or more traction motors of the vehicle, in response to receiving an audio signal, a tactile feedback signal, and/or a drive signal. A type of tactile feedback that is generated is based on, and may be synchronous with, the type of signal received. A method for generating tactile feedback may be implemented in a vehicle configured with at least one tractive motor, such as an example vehicle shown in FIG. 1. The method may be implemented by a control system of the vehicle; an example control system is shown in FIG. 2. As described with respect to FIGS. 3A and 3B, a method for generating tactile feedback in response to receiving a vehicle signal comprises acquiring a vehicle signal and generating a motor input command for one or more traction motors of the vehicle. FIG. 4 shows schematic diagrams indicating a first distribution of motor torque and a second distribution of motor torque in different vehicle configurations to generate vibration and/or movement of the vehicle. FIG. 5 shows a schematic diagram indicating a third distribution of motor torque in the vehicle. FIG. 6 illustrates a flow chart of a method for generating a motor input command for tactile feedback using a traction motor in response to receiving an audio signal. FIG. 7 illustrates a flow chart of a method for implementing a motor input command in an electric motor to generate tactile energy. FIG. 8 shows a timing diagram illustrating generation and output of motor input command in response to receiving different signals, and corresponding power output of traction motors. In this way, tactile energy generated in response to different vehicle signals may be used to enhance a user experience both when the vehicle is driving and when the vehicle is stationary. Tactile energy may be implemented using conventional elements of the vehicle (e.g., vehicle control system, vehicle sensors, traction motor) without inclusion of additional elements, thus a footprint, weight, and complexity of the vehicle may not be increased.

A vehicle control system receives a signal and outputs a control signal (e.g., a motor input command) to one or more electric motors of the vehicle. The control signal corresponds to the type of signal received, and drives the one or more electric motors in different ways. A first motor input command that is generated and output in response to receiving an audio signal drives the one or more electric motors to vibrate a body of the vehicle and/or interior regions of the vehicle to simulate movement that corresponds with the audio signal. A second motor input command that is generated and output in response to receiving a tactile feedback signal drives the one or more electric motors to vibrate and/or move the body of the vehicle and/or parts of the body of the vehicle in a way that provides tactile feedback corresponding to a vehicle condition. A third motor input command that is generated and output in response to receiving a drive signal drives the one or more electric motors to provide rotational motion to corresponding drive wheels of the vehicle. Implementation of one or more of the motor input commands may be influenced by other conditions of the vehicle. For example, the first motor input command may be implemented when the vehicle is in a park mode (e.g., rotational motion is not directed to the drive wheels and/or a park lock is engaged). The second motor input command may be implemented when the vehicle is in a park mode and/or the vehicle is off (e.g., the second motor input command includes activating one or more electric motors from an inactive state). The third motor input command may be implemented when the vehicle is in a drive mode (e.g., rotational motion is directed from the one or more electric machines to corresponding drive wheels). Additionally, implementation of one or more of the motor input command may override implementation of other motor input command. For example, receipt of a tactile feedback signal and output of the second motor input command may halt output of the first motor input command. As a result, the one or more electric machines may be driven in a way that provides tactile feedback corresponding to a vehicle condition, and may not drive vibration of the body of the vehicle that corresponds to an audio signal. Further, receipt of the drive signal and output of the third motor input command may halt output of the first motor input command. As a result, the one or more electric motors may drive rotational motion of the drive wheels of the vehicle and may not drive vibration of the body of the vehicle that corresponds to an audio signal. In some examples, two or more motor input command may be output simultaneously to control an electric motor to produce different behaviors corresponding to each of the received motor input command simultaneously, and/or drive a first electric motor to perform a first behavior and drive a second electric motor to perform a second behavior. For example, the vehicle control system may receive the drive signal and output the third motor input command, and may receive the tactile feedback signal and output the second motor input command. One or more of the electric motors may drive rotational motion of the corresponding drive wheels, and one or more of the same or different electric motors may provide tactile feedback to the vehicle. Thus, tactile feedback may be provided when the vehicle is in motion.

Figure 1:
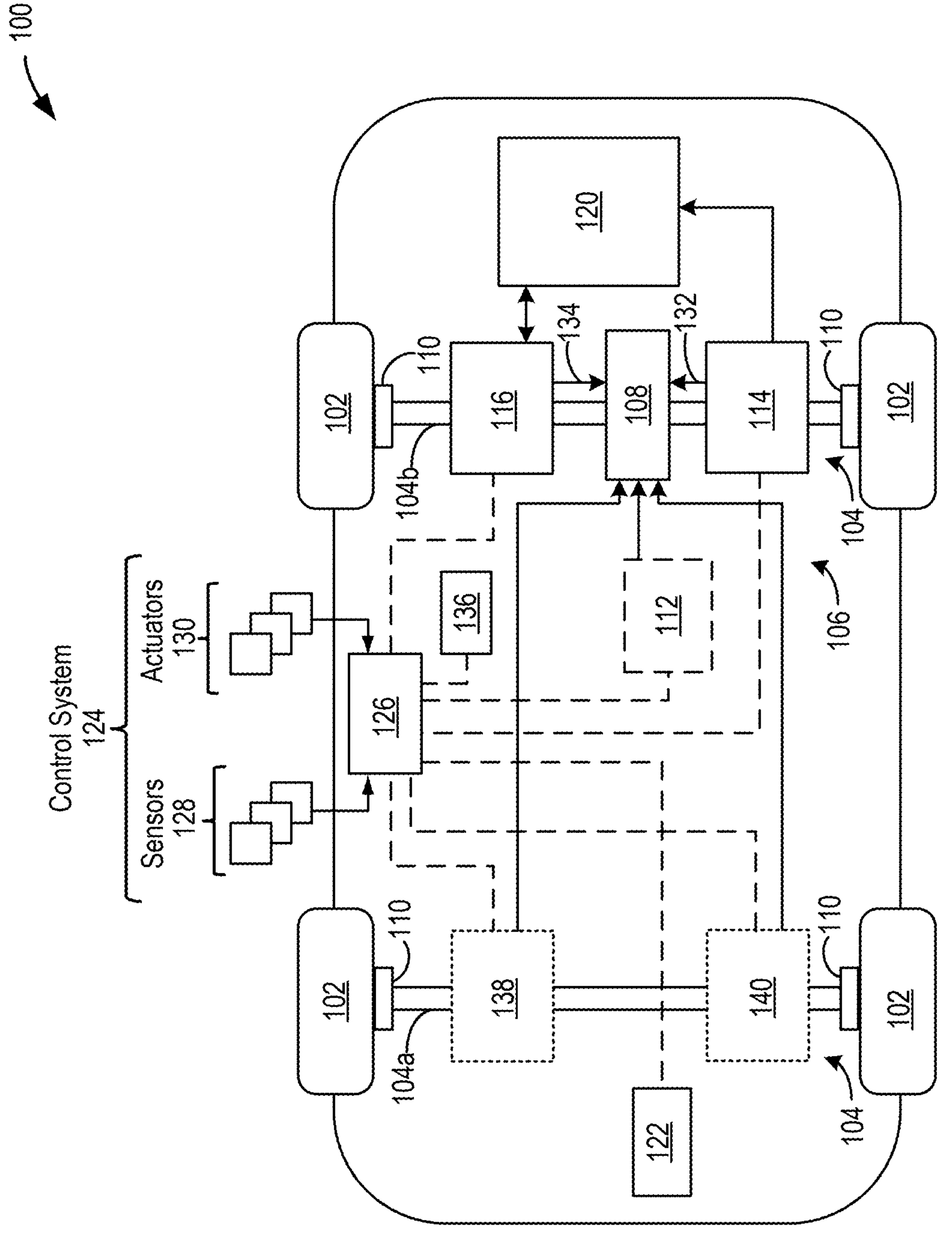
FIG. 1 shows a schematic diagram of an electrical drive train (e-drive) of a vehicle.
Figure 2:
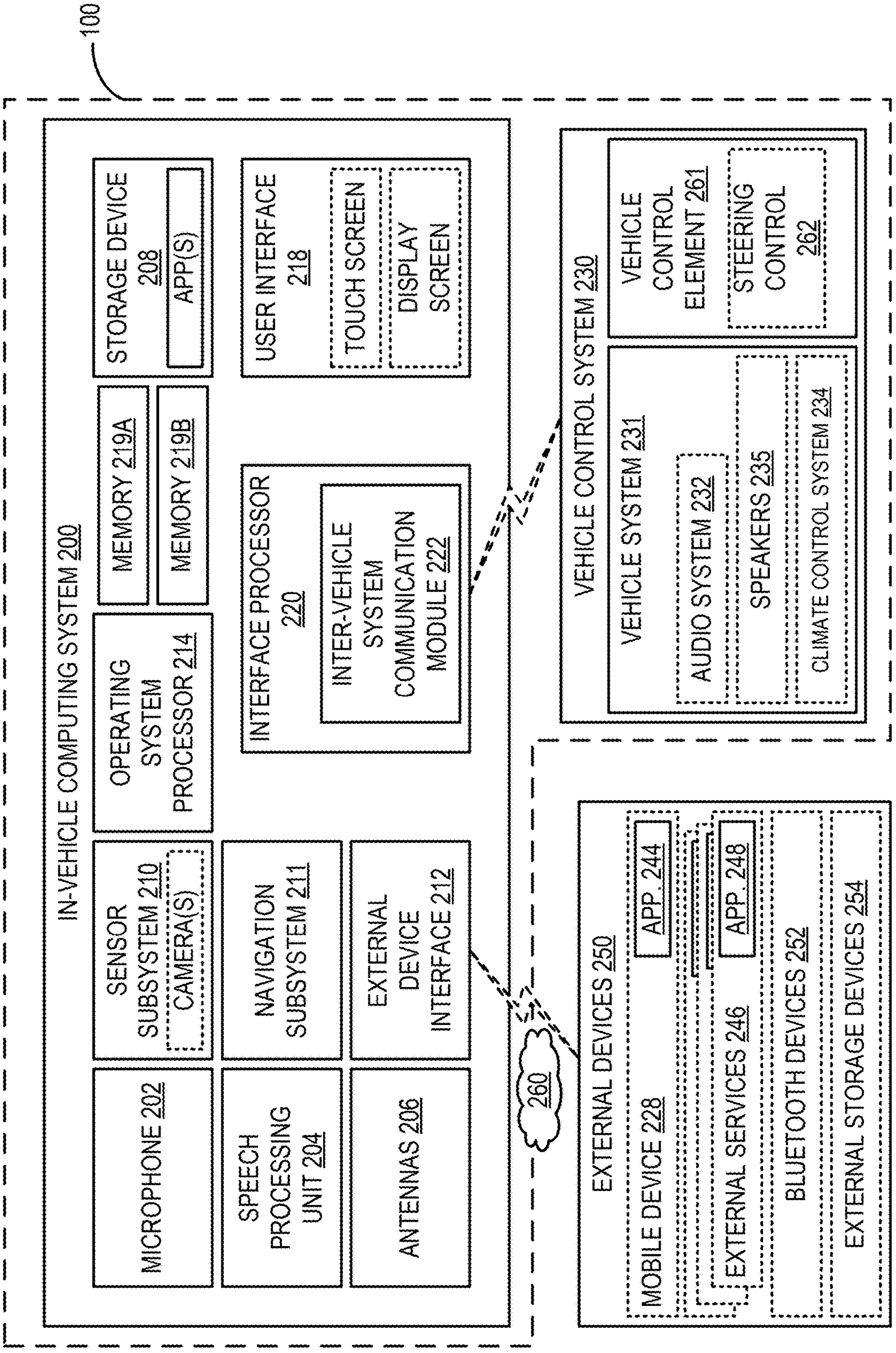

Turning to FIG. 1, a schematic representation of a vehicle 100 is depicted. The vehicle 100 may be an example of an electric vehicle (EV) and/or a hybrid-electric vehicle (HEV) configured with at least one traction motor. The traction motor is configured to provide torque to wheels of the vehicle to drive rotation of the wheels, as well as generate different types of tactile feedback in response to receiving different vehicle signals. It will be appreciated that the vehicle 100 is shown in FIG. 1 for illustrative purposes and is a non-limiting example of how a vehicle configured to implement the methods described herein may be configured. Other examples include various arrangements and positioning of components of the vehicle described herein, as well as additional components not shown in FIG. 1 for brevity.

The vehicle 100 and components thereof may be referred to as a "vehicle system", where generation of tactile feedback, such as vibration or motion of one or more parts of the vehicle system, may be interpreted as being applied to the vehicle 100. For example, the vehicle system may include a sprung mass of the vehicle 100, including any component that is supported by suspension (e.g., a frame, a cab, etc.) of the vehicle 100. This may include door handles, a steering wheel, cushions in the cabin of the vehicle, and so on.

The vehicle 100 includes a set of wheels 102 coupled by axles 104 (e.g., pairs of wheels are coupled to one another by the axles 104). A drive train 106 of vehicle 100 may include a transmission 108 (e.g., a gear box, gear train, etc.) coupled to one or more of the axles 104 of vehicle 100. The transmission 108 may be coupled to a rear axle **104*b* of the axles 104, as shown in FIG. 1, to a front axle 104*a* or to both axles, in other examples. The transmission 108 may translate speed and torque from a rotating source to the wheels 102 to propel vehicle 100. The present configuration includes at least two transmission input shafts and two electric machines. In the embodiments described herein, the electric machines are configured as a first traction motor 114 and a second traction motor 116. A first transmission input shaft 132 couples the first traction motor 114 and the transmission 108, and a second transmission input shaft 134 couples a second traction motor 116 and the transmission 108. Each of the first traction motor 114 and the second traction motor 116 may be mounted to an axle of the axles 104 via a motor mount. In this way, the first traction motor 114 and the second traction motor 116 each drive wheels 102 of the vehicle positioned on the respective axle 104, as further described herein. In some embodiments, the vehicle 100 may further include an auxiliary motor 136 which may be coupled to a steering wheel (not shown) to provide electric steering. In off-highway vehicle applications, a propshaft (not shown) may be included to mechanically couple output of the transmission to input of the axle, such as axles 104. Each of the wheels 102 may have a caliper 110** coupled thereto that, when engaged, may slow or prevent rotation of the vehicle wheel.

In the embodiment shown in FIG. 1, the first traction motor 114 and the second traction motor 116 are positioned on a rear axle **104*b* of the axles 104 to provide rotational power to (e.g., drive) the wheels 102 of the rear axle. In some embodiments, traction motors may be positioned on a front axle 104*a* of the axles 104 to provide rotational power to the wheels of the front axle, as indicated by a first dashed box 138 and a second dashed box 140, each of which may represent the first traction motor 114 and the second traction motor 116, respectively, or may represent an additional traction motor (e.g., in addition to the first traction motor 114 and the second traction motor 116). In other embodiments, each of the first traction motor 114 and the second traction motor 116 may be positioned on different axles. For example, the first traction motor 114 may be positioned on the front axle 104*a* to provide rotational power to (e.g., drive) wheels 102 positioned thereon (e.g., as indicated by the first dashed box 138), and the second traction motor 116 may be positioned on the rear axle 104*b* to provide rotational power to (e.g., drive) wheels 102 positioned thereon. The transmission 108 may allow for selective torque distribution to the first traction motor 114 and the second traction motor 116**.

When configured as an EV, the rotating sources may be the first traction motor 114, and the second traction motor 116. The first traction motor 114 and second traction motor 116 may be motor/generators, with a capacity to convert electrical energy into mechanical energy and vice versa. The first traction motor 114 and second traction motor 116 may be electrically coupled to a traction battery 120 of vehicle 100 to both draw power from the traction battery 120 and provide electrical energy to be stored at the traction battery 120. The vehicle 100 may be configured as a battery electric vehicle (BEV), wherein the first traction motor 114 and the second traction motor 116 may use chemical energy stored in a rechargeable battery pack (e.g., the traction battery 120) to propel the vehicle without assistance from a second source of propulsion, such as an engine. In some embodiments, the vehicle 100 may be configured as a hybrid electric vehicle (HEV) and include an engine 112, such as an internal combustion engine (ICE), as well as the first traction motor 114 and the second traction motor 116 to propel the vehicle.

The traction motors may be similarly configured, e.g., having similar operational speed and torque ranges, and thereby referred to as symmetric, or may have different speed and torque outputs, thereby referred to as asymmetric. As described herein, the first traction motor 114 and the second traction motor 116 are used for propulsion of the vehicle as well as generation of lower-frequency tactile energy (e.g., vibration). For example, lower-frequency may be considered between 5 Hz and 1,000 Hz.

Adjustment of the drive train between various modes as well as control of operations within each mode may be executed based on a vehicle control system 124, including a controller 126. Controller 126 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions (e.g., computer readable instructions) executable by a processor for performing the methods described below as well as other variants that are anticipated but not specifically listed. In one example, controller 126 may be a powertrain control module (PCM).

Controller 126 may receive various signals from sensors 128 coupled to various regions of vehicle 100. For example, the sensors 128 may include sensors at the first traction motor 114 and second traction motor 116 to measure motor speed and motor temperature, a pedal position sensor to detect a depression of an operator-actuated pedal, such as a foot pedal, speed sensors at the wheels 102, etc. Vehicle driving torque may be directly proportional to pedal position, for example, degree of depression. As further described herein, the controller 126 may receive signals from other sensors and/or systems of the vehicle and adjust operation of the drive train accordingly. For example, the controller 126 may receive one or more of audio signals, vehicle tactile feedback signals, and drive signals. Upon receiving the signals from the various sensors 128 of FIG. 1, controller 126 processes the received signals, and employs various actuators 130 of vehicle 100 to adjust drive train operations based on the received signals and computer readable instructions stored on the memory of controller 126. For example, controller 126 may receive an indication of depression of the caliper pedal, signaling a desire for decreased vehicle speed. In response, the controller 126 may command engagement of the caliper 110 of at least one set of wheels 102. Additionally, the controller 126 may command operation of at least one of the traction motors as a generator to recharge the traction battery 120. In another example, the controller 126 may adjust drive train operations based on a type of signal received. In response to receiving an audio signal, the controller 126 may generate a first motor input command and output the first motor input command to one or more of the first traction motor 114 and the second traction motor 116 to generate tactile feedback (e.g., vibration and/or movement) that corresponds to the audio signal. In response to receiving a tactile feedback signal, such as a signal indicating a vehicle operation state change, a signal from a user interface device, and/or a signal indicating a vehicle behavior change, the controller 126 may generate a second motor input command and output the second motor input command to one or more of the first traction motor 114 and the second traction motor 116 to generate tactile feedback that corresponds to the type of tactile feedback signal received. In response to receiving a drive signal, the controller 126 may generate a third motor input command and output the third motor input command to one or more of the first traction motor 114 and the second traction motor 116 to drive the wheels of the vehicle. In examples where the vehicle 100 includes one or more auxiliary motors 136, the first motor input command and/or the second motor input command may be applied to the auxiliary motor 136 in addition to and/or instead of the first traction motor 114 and/or the second traction motor 116 so that the auxiliary motor 136 may provide torque feedback to different elements of the vehicle 100, such as the steering wheel, a door handle, a passenger cushion, and so on in accordance with the audio signal and/or the tactile feedback signal.

FIG. 2 shows a block diagram of an in-vehicle computing system 200 for a vehicle. The in-vehicle computing system 200 may be an example of the control system 124 of the vehicle 100 of FIG. 1. In-vehicle computing system 200 may perform one or more of the methods described herein. For example, the in-vehicle computing system 200 may be configured to generate and output one or more motor input commands, in response to receiving a signal, to control tactile feedback and/or to drive wheels of the vehicle. In-vehicle computing system 200 may include, or be coupled to, various vehicle systems, sub-systems, hardware components, as well as software applications and systems that are integrated in, or integratable into, vehicle 100 in order to enhance an in-vehicle experience for a driver and/or a passenger.

In-vehicle computing system 200 may include one or more processors including an operating system processor 214 and an interface processor 220. Operating system processor 214 may execute an operating system on in-vehicle computing system 200, and control input/output, display, playback, and other operations of the in-vehicle computing system 200. Interface processor 220 may interface with a vehicle control system 230 via an inter-vehicle system communication module 222.

Inter-vehicle system communication module 222 may output data to one or more other vehicle systems 231 and/or one or more other vehicle control elements 261, while also receiving data input from other vehicle systems 231 and other vehicle control elements 261, e.g., by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System (GPS) sensors, and so on), and digital signals propagated through vehicle data networks (such as a multimedia data network through which multimedia data is communicated between multimedia components in the vehicle). For example, in-vehicle computing system 200 may retrieve a power state of the vehicle via a battery and/or power distribution system of the vehicle, an ignition state of the vehicle, and so on. In addition, other interfacing means such as Ethernet may be used as well without departing from the scope of this disclosure.

A storage device 208 may be included in in-vehicle computing system 200 to store data such as computer readable instructions executable by operating system processor 214 and/or interface processor 220 in non-volatile form. Storage device 208 may store application data, including prerecorded sounds, to enable in-vehicle computing system 200 to run an application for connecting to a cloud-based server and/or collecting information for transmission to the cloud-based server. The application may retrieve information gathered by vehicle systems and/or sensors, input devices (e.g., a user interface 218), data stored in one or more storage devices, such as a volatile memory 219A or a non-volatile memory 219B, devices in communication with the in-vehicle computing system (e.g., a mobile device connected via a Bluetooth® link), and so on. In-vehicle computing system 200 may further include the volatile memory 219A. Volatile memory 219A may be random access memory (RAM). Non-transitory storage devices, such as non-volatile storage device 208 and/or non-volatile memory 219B, may store instructions and/or code that, when executed by a processor (e.g., operating system processor 214 and/or interface processor 220), controls in-vehicle computing system 200 to perform one or more of the actions described in the disclosure.

A microphone 202 may be included in in-vehicle computing system 200 to receive voice commands from a user, to measure ambient noise in the vehicle, to determine whether audio from speakers of the vehicle is tuned in accordance with an acoustic environment of the vehicle, and so on. A speech processing unit 204 may process voice commands, such as the voice commands received from microphone 202. In some embodiments, in-vehicle computing system 200 may also receive voice commands and sample ambient vehicle noise using a microphone included in an audio system 232 of the vehicle.

One or more additional sensors may be included in a sensor subsystem 210 of in-vehicle computing system 200. Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, caliper pedal input, transmission selector position, vehicle speed, engine speed, mass airflow through the engine, ambient temperature, intake air temperature, and so on, as well as inputs from climate control system sensors (such as heat transfer fluid temperature, antifreeze temperature, fan speed, passenger compartment temperature, desired passenger compartment temperature, ambient humidity, and so on), an audio sensor detecting voice commands issued by a user, a fob sensor receiving commands from and optionally tracking the geographic location/proximity of a fob of the vehicle, and so on.

While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

An external device interface 212 of in-vehicle computing system 200 may be selectively coupled to and/or communicate with one or more external devices 250 located external to vehicle 100. While the external devices are illustrated as being located external to vehicle 100, it is to be understood that they may be temporarily housed in vehicle 100, such as when the user is operating the external devices while operating vehicle 100. In other words, external devices 250 are not integral to vehicle 100. External devices 250 may include a mobile device 228 (e.g., connected via a Bluetooth®, NFC, WI-FI Direct®, or other wireless connection) or an alternate Bluetooth®-enabled device 252. (Wi-Fi Direct® is a registered trademark of Wi-Fi Alliance, Austin, Texas.)

Mobile device 228 may be a mobile phone, smart phone, wearable devices/sensors that may communicate with the in-vehicle computing system via wired and/or wireless communication, or other portable electronic device(s). Other external devices include one or more external services 246. For example, the external devices may include extra-vehicular devices that are separate from and located externally to the vehicle. Still other external devices include one or more external storage devices 254, such as solid-state drives, pen drives, Universal Serial Bus (USB) drives, and so on. External devices 250 may communicate with in-vehicle computing system 200 either wirelessly or via connectors without departing from the scope of this disclosure. For example, external devices 250 may communicate with in-vehicle computing system 200 through external device interface 212 over a network 260, a USB connection, a direct wired connection, a direct wireless connection, and/or other communication link.

External device interface 212 may provide a communication interface to enable the in-vehicle computing system to communicate with mobile devices associated with contacts of the driver. For example, external device interface 212 may enable phone calls to be established and/or text messages (e.g., Short Message Service (SMS), Multimedia Message Service (MMS), and so on) to be sent (e.g., via a cellular communications network) to a mobile device associated with a contact of the driver. External device interface 212 may additionally or alternatively provide a wireless communication interface to enable the in-vehicle computing system to synchronize data with one or more devices in the vehicle (e.g., the driver's mobile device) via Wi-Fi Direct®, as described in more detail below.

One or more applications 244 may be operable on mobile device 228. As an example, a mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, and so on. The collected data may be transferred by application 244 to external device interface 212 over network 260. In addition, specific user data requests may be received at mobile device 228 from in-vehicle computing system 200 via external device interface 212. The specific data requests may include requests for determining where the user is geographically located, an ambient noise level and/or music genre at the user's location, an ambient weather condition (temperature, humidity, and so on) at the user's location, and so on. Mobile device application 244 may send control instructions to components (e.g., microphone, amplifier, and so on) or other applications (e.g., navigational applications) of mobile device 228 to enable the requested data to be collected on the mobile device or requested adjustment made to the components. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, and so on), data from an internet query (e.g., weather data, POI data), data from an edge computing device to which the in-vehicle computing system 200 is communicably coupled, and so on. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of a climate control system 234 for meeting the cabin cooling or heating needs of the vehicle occupants, as well as aspects of a telecommunication system 236 for enabling vehicle occupants to establish telecommunication linkage with others.

Audio system 232 may include one or more acoustic reproduction devices including electromagnetic transducers such as one or more speakers 235. Vehicle audio system 232 may be passive or active such as by including a power amplifier. In some examples, in-vehicle computing system 200 may be a sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies. Audio system 232 may include one or more audio sources, such as a radio, compact disc player, MP3 player, a video gaming system, a video system, combinations thereof, and so on. The audio system 122 may be coupled to the controller 126 such that, when an audio signal is generated by an audio source of the audio system, the audio signal may be used to generate the first motor input command.

Vehicle control system 230 may also include controls for adjusting the settings of various vehicle control elements 261 (or vehicle controls, or vehicle system control elements) related to the engine, traction motors, and/or auxiliary elements within a cabin of the vehicle, such as one or more steering wheel controls 262 (e.g., steering wheel-mounted audio system controls, cruise controls, windshield wiper controls, headlight controls, turn signal controls, and so on), instrument panel controls, microphone(s), foot/clutch pedals, a gear shift, door/window controls positioned in a driver or passenger door, designated passenger position controls, cabin light controls, audio system controls, cabin temperature controls, and so on. Vehicle control elements 261 may also include internal traction motor and vehicle operation controls that are configured to receive instructions via the CAN bus of the vehicle to change operation of one or more of the engine, traction motors, exhaust system, transmission, and/or other vehicle system. The control signals may also control audio signal at one or more speakers 235 of vehicle audio system 232. For example, the control signals may adjust audio signal characteristics such as volume, equalization, audio image (e.g., the configuration of the audio signals to produce audio signal that appears to a user to originate from one or more defined locations), audio distribution among a plurality of speakers, and so on. In further examples, in-vehicle computing system 200 may adjust a radio station selection, a playlist selection, a source of audio signal (e.g., from radio or CD or MP3), and so on, based on user input received directly via touch screen, or based on data regarding the user (such as a physical state and/or environment of the user) received via one or more external devices (e.g., a mobile device). The in-vehicle computing system 200 may further receive input from a user and adjust a selection of elements of the audio system which may be used to generate tactile feedback corresponding to an audio signal. Briefly, corresponding vehicle vibration may be generated for a user selected audio source and vehicle vibration may not be generated for an unselected audio source.

Control elements positioned on an outside of a vehicle (e.g., controls for a security system) may also be connected to in-vehicle computing system 200, such as via inter-vehicle system communication module 222. The control elements of vehicle control system 230 may be physically and permanently positioned on and/or in the vehicle for receiving user input. In addition to receiving control instructions from in-vehicle computing system 200, vehicle control system 230 may also receive input from one or more external devices 250 operated by the user, such as from mobile device 228. This allows aspects of vehicle systems 231 and vehicle control elements 261 to be controlled based on user input received from external devices 250. For example, the vehicle control system 230 may receive a tactile feedback signal from an external device 250, such as a mobile device 228 and/or a key fob, and in response the vehicle control system 230 may generate a second motor input command for at least one traction motor, where the second motor input command drives generation of tactile feedback. For example, the second motor input command may drive movement of the vehicle, flashing of the headlights, and so on.

In-vehicle computing system 200 may further include one or more antennas 206. The in-vehicle computing system may obtain broadband wireless internet access via antennas 206, and may further receive broadcast signals such as radio, television, weather, traffic, and the like. In-vehicle computing system 200 may receive positioning signals such as GPS signals via antennas 206. The in-vehicle computing system may also receive wireless commands via radio frequency (RF) such as via antennas 206 or via infrared or other means through appropriate receiving devices. In some embodiments, antenna 206 may be included as part of audio system 232. Additionally, antenna 206 may provide AM/FM radio signals to external devices 250 (such as to mobile device 228) via external device interface 212.

One or more elements of in-vehicle computing system 200 may be controlled by a user via user interface 218. User interface 218 may include a graphical user interface presented on a touch screen, passenger screen and speaker system, user-actuated buttons, switches, knobs, dials, sliders, and so on. For example, user-actuated elements may include steering wheel controls, door and/or window controls, instrument panel controls, audio system settings, climate control system settings, and the like. A user may also interact with one or more applications of in-vehicle computing system 200 and mobile device 228 via user interface 218. The user interface 218 may receive user input to the in-vehicle computing system for controlling audio signal, visual display output, user preferences, control parameter selection, and so on. In addition to receiving a user's vehicle setting preferences on user interface 218, vehicle settings selected by in-vehicle control system 230 may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3A:
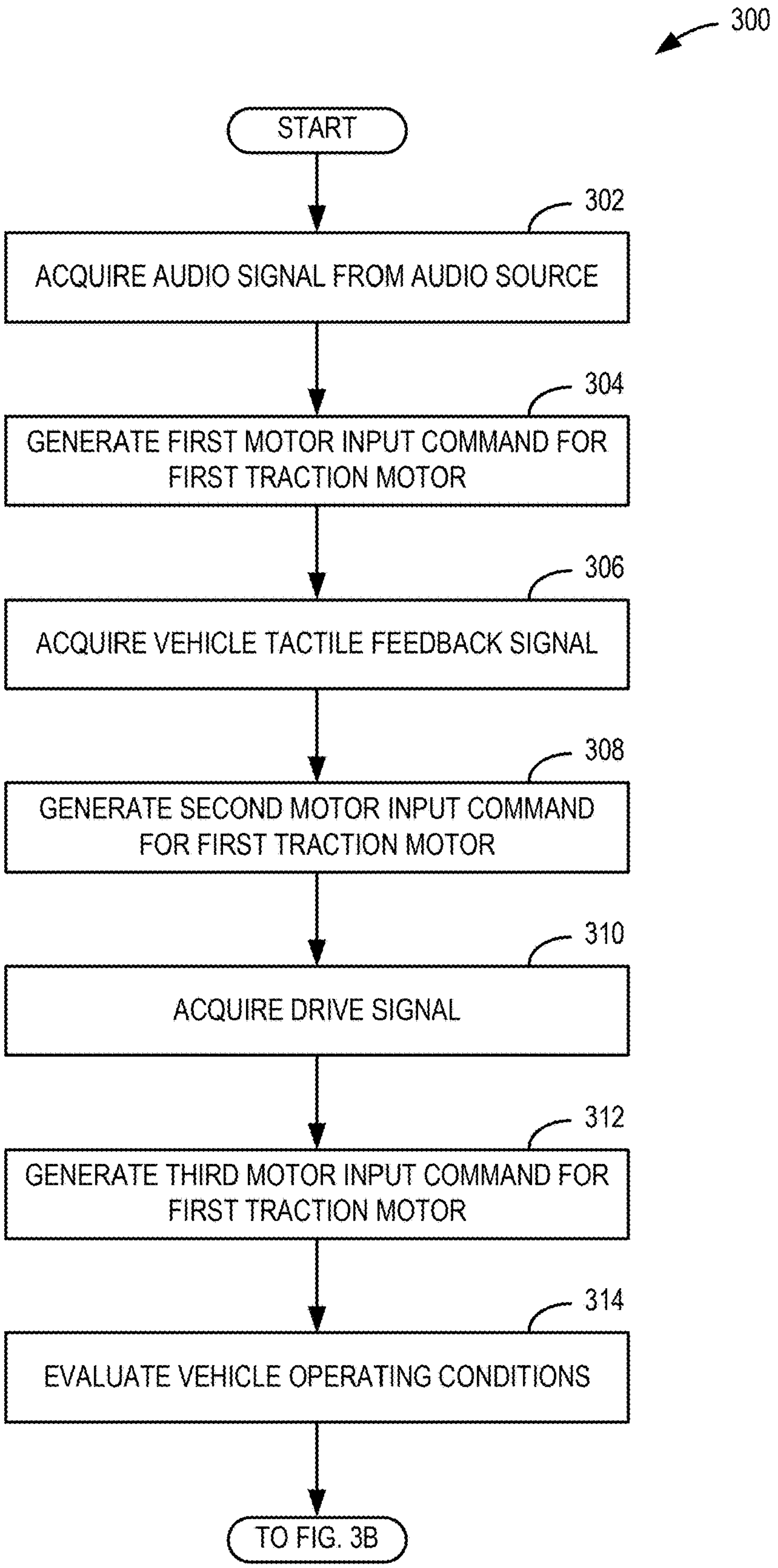
FIGS. 3A and 3B show a flowchart for a method for generating and outputting motor input commands for a traction motor of a vehicle in response to acquiring one or more of an audio signal, a vehicle tactile feedback signal, and a drive signal.
Figure 3B:
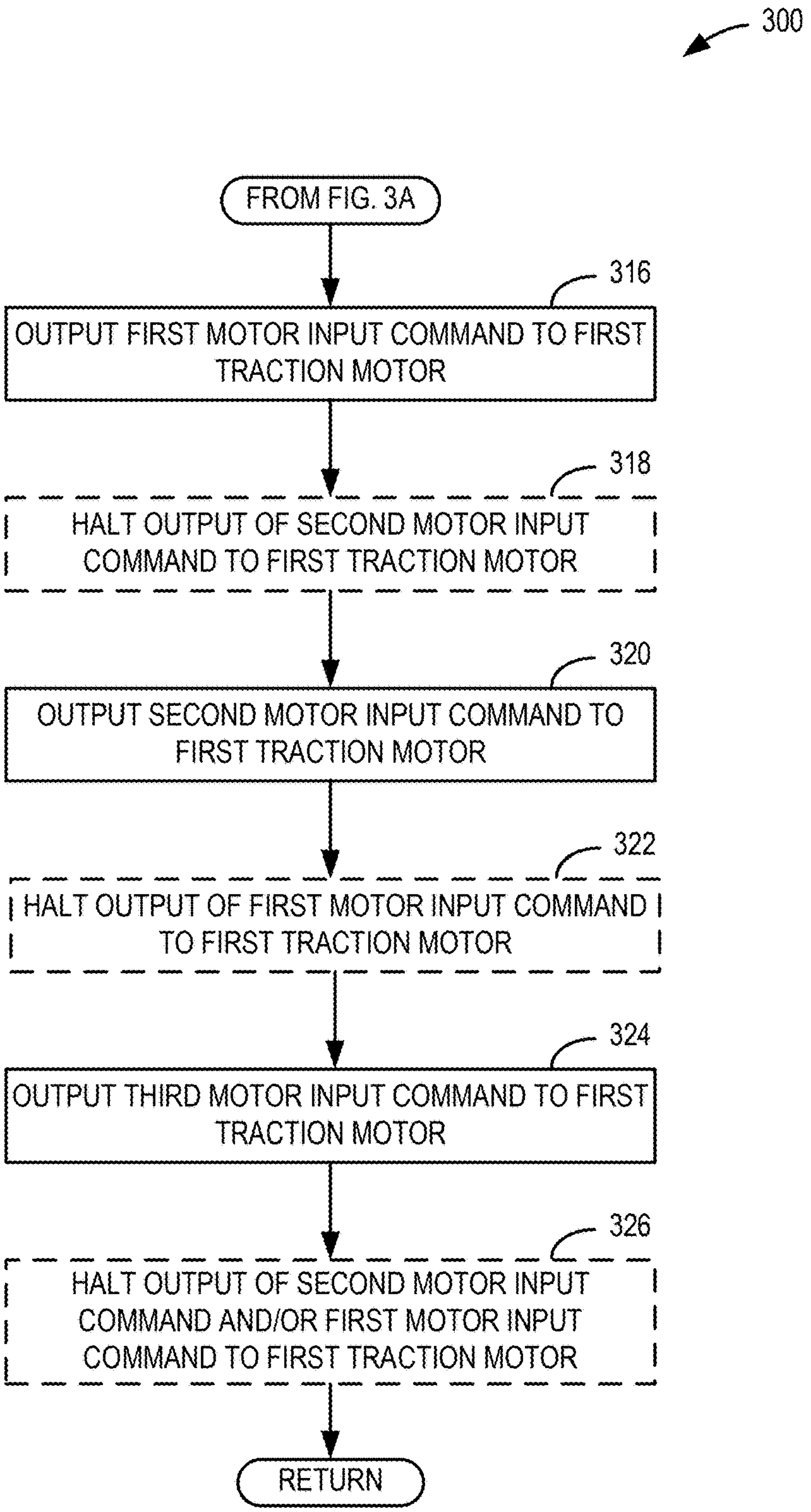

FIGS. 3A and 3B shows a flowchart for a method 300 for generating tactile feedback, including vibration of a vehicle system, in response to receiving one or more of an audio signal, a tactile feedback signal, and a drive signal. Instructions for carrying out the method 300 and the rest of the methods included herein may be executed by a controller based on instructions (e.g., computer readable instructions) stored on memory of the controller and in conjunction with signals received from sensors of the vehicle. The controller may employ actuators of the vehicle to adjust traction motor operation, according to the methods described below. For example, the method 300 may be implemented in the vehicle 100 of FIG. 1 by the in-vehicle computing system 200 of FIG. 2. The method 300 is described with respect to FIGS. 1-2. Some operations of the method 300 may be executed in an order that differs from the order shown in the flow chart, as further described herein. The methods described herein may be implemented in existing vehicle systems without demanding inclusion of additional controllers and/or traction motors. The methods operate to control existing controllers and/or generate signals that exist within various other vehicle operation modules to generate tactile vehicle feedback.

At 302, the method 300 includes acquiring an audio signal from an audio source. An audio signal may be an electronic signal including audio waveform information. The audio signal may be from video, music, podcasts, audiobooks, games, phone calls, vehicle chimes, notifications, and so on. For example, the audio signal may include dialogue, music, sound effects, commentary, and so on. The audio signal may also be one or more parts of a music output; for example, the audio signal may correspond to a bass line of a song. In some examples, the audio signal may be a low-frequency wave configured to stimulate therapeutic effects, such as music having alpha, delta, and/or theta waves. The audio source may be included in an audio system (e.g., the audio system 232 of FIG. 2), including CD, DVD, AM/FM/Satellite radio, and/or an external device (e.g., the external devices 250 of FIG. 2), including cloud streaming services, mobile devices, wired devices, a Bluetooth device coupled to the vehicle audio system, or other audio signal transfer method.

At 304, the method 300 includes generating a first motor input command for a first traction motor. Generating the first motor input command from the audio signal may include processing the audio signal, for example using a low-pass filter with a cutoff frequency and/or a band-pass filter to determine a frequency of audio signal for which to generate the first motor input command. The first motor input command may be configured to drive the first motor to generate vibrations that correspond with a decibel level of the audio signal (e.g., the processed audio signal), using a frequency content of the audio signal. For example, in response to receiving the first motor input command, the first electric motor may provide low frequency fore-aft shaking of the vehicle that corresponds with audio playing through speakers of the vehicle. Vibration of the vehicle (e.g., generated when the first motor input command is output to the first traction motor) may be temporally aligned (e.g., synchronized) with the audio signal. An intensity of vibration may be correlated with a volume of the audio signal, in some embodiments. In other embodiments, vibration may have a preset intensity level and a frequency of vibration may be correlated with the audio signal, such that the vehicle vibrates in tandem with the audio signal being output by the vehicle audio system. The first motor input command may be generated using arbitrary and/or pre-determined frequency content. In these embodiments, the processed audio signal may act as a trigger, such that generation of the first motor input command is triggered when the processed audio signal exceeds a trigger threshold. An example method for generating the first motor input command in response to acquiring the audio signal is described with respect to FIG. 6.

At 306, the method 300 includes acquiring a vehicle tactile feedback signal from a system of the vehicle and/or from an external device communicably coupled to the control system of the vehicle. The vehicle tactile feedback signal may be one of a variety of signals that indicates a vehicle operation state change, a user input from a user interface device, and/or a signal indicating a vehicle behavior change.

At 308, the method 300 includes generating a second motor input command for the first traction motor. Similar to the first motor input command, the second motor input command may be configured to drive the first traction motor to generate vibration, pulses, and/or other tactile energy that directly corresponds to the vehicle tactile feedback signal. Additionally, the second motor input command may be configured to drive the first traction motor to generate a preset intensity level and/or frequency of vibration, movement, and/or other form of tactile energy. Examples of vehicle tactile feedback signals and corresponding second motor input commands are described herein.

The vehicle tactile feedback signal may be received from one or more elements of the vehicle (e.g., the vehicle 100), and/or an element (e.g., of the external devices 250) that is communicably coupled to the vehicle. For example, a smart device such as a heart rate monitor or other biofeedback device may be communicably coupled to the vehicle, and may provide biofeedback signals as vehicle tactile feedback signals to the controller of the vehicle. The biofeedback signals may be used to generate the second motor input command that drives the first traction motor to generate vibration and/or pulses of the vehicle. This may mitigate anxiety and/or elevate awareness of a user in the vehicle.

In other examples, the vehicle tactile feedback signal may be a signal indicating the vehicle is ready to drive. When the vehicle is configured as an electric vehicle (EV), startup of the vehicle may not provide a physical vehicle shake sensation, compared to startup of a vehicle configured with an internal combustion engine (ICE). In an EV, the vehicle tactile feedback signal may indicate the vehicle is ready to transition to a drive mode (e.g., traction motors used to drive wheels of the vehicle are on). In response to receiving the vehicle tactile feedback signal, the second motor input command may be configured to drive the first traction motor to generate vibration and/or pulses of the vehicle that indicate the vehicle is ready to transition to the drive mode.

The vehicle tactile feedback signal may additionally provide indication to a user that one or more doors of the vehicle have been locked. For example, in response to a user input (e.g., pressing a button) on a key, a fob, and/or a smart device, the vehicle tactile feedback signal may be generated and sent to the vehicle control system. The vehicle tactile feedback signal may be configured to generate the second motor input command that drive the first traction motor to generate a vertical bobbing motion of the vehicle to signal that doors of the vehicle have been locked. In another example, the vehicle tactile feedback signal may drive generation and output of the second motor input command configured to drive the first traction motor to generate high frequency vibration at a handle of a door of the vehicle to indicate the door has been locked.

In further examples, the vehicle tactile feedback signal may be used to simulate directional movement of the vehicle when the vehicle is parked (e.g., not experiencing directional movement). The vehicle tactile feedback signal may include a pre-recorded drive route vibration pattern that includes movement of the body of the vehicle (e.g., simulating vibration from driving over a drive surface, stopping at traffic signals, turning, etc.) without directional movement of the vehicle. The second motor input command may drive the first traction motor to generate vibrations and other movements of the body of the vehicle that correspond to and/or simulate the pre-recorded drive route without directionally driving the vehicle. This may be used to provide a virtual ride of the vehicle to assist with getting babies to sleep. In this way, a dynamic experience may be simulated when in actuality the vehicle is generating a static experience. Similarly, the vehicle tactile feedback signal may be used to generate the second motor input command configured to drive the first traction motor to rock the vehicle, similar to a cradle, using a modified sine wave. The vehicle tactile feedback signal may further include pulses to simulate a heartbeat.

The vehicle tactile feedback signal may further be used to indicate an operational state change of the vehicle. For example, the vehicle tactile feedback signal may be generated by a sensor system of the vehicle in response to a tire pressure of a wheel of the vehicle approaching a maximum desirable tire pressure. The second motor input command may be configured to drive the first traction motor to generate a vibration that gradually increases in intensity at a rate that directly corresponds to an increase in tire pressure. In this way, the vehicle tactile feedback signal may be used to generate tactile feedback, such as vibration of the wheel of the vehicle, that may assist a user in filling a tire with a desired amount of air.

In some examples, the vehicle tactile feedback signal may be used to personalize a vehicle and/or assist a user in locating the vehicle. The second motor input command may be configured to drive the first traction motor to generate static movement of the vehicle (e.g., bob or nod the body of the vehicle up and down without generating directional movement of the vehicle) in response to detection of a user. For example, the user may hold a key, a fob, and/or another smart device that is communicably coupled to the vehicle (e.g., one or more of the external devices 250). When the external device 250 is detected by the in-vehicle computing system of the vehicle to be within a defined range of the vehicle (e.g., within 10 feet of the vehicle), the vehicle tactile feedback signal may be acquired from the communicably coupled device. The control system of the vehicle may generate and output the second motor input command to the first traction motor to generate static personalized experience of the vehicle. In another example, the vehicle tactile feedback signal may be received by the controller of the vehicle in response to a user input, such as pressing an unlock button on a key and/or a door handle of the vehicle. The vehicle tactile feedback signal may be combined with one or more signals to generate light and/or sound from the vehicle. For example, in response to receiving a user input to locate the vehicle (e.g., pressing a locate button on a key, fob, or other user device), the vehicle tactile feedback signal may be received by the control system of the vehicle and used to generate the second motor input command to generate a “nod” or “bob” motion of a body of the vehicle. Additionally, headlight beams of the vehicle may be illuminated and/or animated, and the vehicle may output audio.

The vehicle tactile feedback signal may further provide tactile feedback indicating detection of one or more obstacles in proximity to the vehicle during directional vehicle motion. For example, the vehicle may be configured to be driven via a user input device positioned on an exterior of the vehicle, such as on a tailgate and/or bumper of the vehicle. A user may provide input to the user input device to drive the vehicle, and sensors of the vehicle (e.g., cameras, proximity sensors, etc.) may detect a presence of one or more objects/obstacles in proximity to the vehicle that may not be visible to the user from the position of the user at the user input device. The vehicle tactile feedback signal may be used to generate the second motor input command configured to drive the first traction motor to generate vibration of one or more of the user input device and the body of the vehicle to indicate to the user the presence of the object.

During dynamic experiences (e.g., when the vehicle is directionally moving) the vehicle tactile feedback signal may be used to generate vestibular stimulation of the vehicle. The vehicle tactile feedback signal may be received during driving of the vehicle (e.g., when a drive signal is being received) and the vehicle tactile feedback signal may be used to generate and output the second motor input command during generation and output of the third motor input command to drive the vehicle. For example, the vehicle tactile feedback signal may provide a masking vibration, such as a vibration at 50 Hz, which may assist in reducing perceived car sickness. The vibration may be modulated in response to user input, as well as a function of steering and/or caliper pedal inputs.

The vehicle tactile feedback signal may additionally provide tactile feedback indicating road conditions during driving of the vehicle. For example, one or more sensors of the vehicle may detect a presence of lane boundaries and, in response to the vehicle approaching and/or traveling outside of the lane boundaries, the vehicle tactile feedback signal may be used to generate vibration that simulates driving over a physical rumble strip or other uneven driving surface. This may assist in alerting occupants of the vehicle to impending and/or occurring lane departure or other road obstacle.

At 310, the method 300 includes acquiring a drive signal. The drive signal may be a request to use traction motors to drive wheels of the vehicle to drive directional movement of the vehicle. The drive signal may be acquired from one or more sensors and/or user input devices of the vehicle. For example, the drive signal may include input from a pedal sensor, such as depression of a gas pedal, to drive directional motion of the vehicle. The drive signal may thus demand generation of torque via one or more electric motors of the vehicle to drive wheels of the vehicle. In another example, the drive signal may include input from a sensor other than the pedal sensor, such as a nudge tailgate or controller positioned on an exterior of the vehicle.

At 312, the method 300 includes generating a third motor input command for the first traction motor. The third motor input command may be a conventional command configured to drive the first traction motor to generate torque and provide rotational power to drive one or more wheels that are coupled to the first traction motor.

One or more of the audio signal, the vehicle tactile feedback signal, and the drive signal may be received simultaneously and/or in a different order than described herein with respect to the method 300. Additionally, one or more of the audio signal, the vehicle tactile feedback signal, and the drive signal may be received during different operating modes of the vehicle, such as when a power source of the vehicle (e.g., an ICE and/or electric traction motors) are powered on or are powered off, and when the drivetrain of the vehicle is in a drive mode or a park mode. An operating mode of the vehicle when the signal is acquired may be affected by which, if any, additional signals are simultaneously acquired and/or which, if any, motor input commands are being output to the first traction motor. At 314, the method 300 includes evaluating vehicle operating conditions. Vehicle operating conditions may include various vehicle conditions (e.g., vehicle operating mode), various power source operating conditions (e.g., traction motor operating mode, engine operating mode), and various ambient conditions (e.g., temperature, barometric pressure, humidity, date, time, etc.). In addition to power source operating conditions, fuel system conditions may also be monitored, such as batter charge state for a battery coupled to the traction motor. Operating conditions may be measured by one or more sensors coupled to a controller, such as sensors of the sensor subsystem 210.

The method 300 continues in FIG. 3B. The method 300 includes outputting one or more of the first motor input command, the second motor input command, and the third motor input command to the first traction motor. The motor input command (e.g., the first motor input command, the second motor input command, and/or the third motor input command) may be output by the in-vehicle computing system 200 of FIG. 2 and be received by the vehicle control system 230, which may command torque distribution to the first traction motor according to the motor input command. In some examples, the motor input command may be distributed differently among a plurality of traction motors depending on a configuration of the vehicle drivetrain. For example, the first motor input command may be output to a second traction motor in addition to being output to the first traction motor. Motor input commands to various traction motors may be in phase, out of phase, or of variable phase. Additionally, outputting one or more of the motor input commands to the first traction motor may include halting output of another of the motor input commands to the first traction motor and/or to other traction motors (e.g., the second traction motor, the auxiliary motor).

At 316, the method 300 includes outputting the first motor input command to the first traction motor. The method 300 may be continuously implemented, wherein audio signals are processed, the first motor input command is generated, and the first motor input command is output to the first traction motor in real time such that corresponding vibration of the vehicle based on the first motor input command occurs synchronously with output of the audio signal (e.g., from speakers in a cabin of the vehicle).

In some examples, the first motor input command may be output to the traction motor when the vehicle is in a park mode. In some examples, the park mode may include engagement of a parking lock of the vehicle. In other examples, the park mode may include engagement of a four-corner foundation caliper of the vehicle. In both examples of the park mode, the first motor input command may be output to the first traction motor. Engagement of different types of calipers of the vehicle may result in different sensations experienced by the vehicle in response to output of the same motor input command. An additional example of generation and output of the first motor input command is described with respect to FIGS. 6 and 7.

At 318, the method 300 optionally includes halting output of the second motor input command to the first traction motor. During evaluation of vehicle operating conditions at operation 314 of the method 300, it may be determined that the controller is outputting the second motor input command to the first traction motor. In some vehicle operational states, it may be desirable to generate tactile motion that corresponds with audio signals or to generate tactile motion that correspond with a vehicle tactile feedback signal (e.g., that indicates a state change of the vehicle, such as a "nod" or "bob" of the vehicle to indicate the vehicle is locked). Halting output of the second motor input command may allow for differentiation among what is being indicated by the vehicle tactile response generated by the first traction motor.

In another example, the method 300 may include outputting the first motor input command to the first traction motor when the third motor input command is not being output to the first traction motor. During evaluation of vehicle operating conditions at operation 314 of the method 300, it may be determined that the controller is outputting the third motor input command to the first traction motor. Further, the first motor input command may be output to the first traction motor when the vehicle is in a drive mode (e.g., the third motor input command is being output to the first traction motor and the vehicle is being directionally driven). For example, the first motor input command may be output to the first traction motor to generate vibration and/or motion of one or more areas of a cabin of the vehicle (e.g., one or more designated passenger locations), and the third motor input command may be output to the first traction motor and/or to additional traction motors (e.g., the second traction motor) to drive rotation of wheels of the vehicle.

At 320, the method 300 includes outputting the second motor input command to the first traction motor. The second motor input command may be output to the first traction motor during directional vehicle motion, referred to herein as a dynamic experience, and when the vehicle is parked, referred to herein as a static experience. In this way, tactile energy may supplement a user experience during different operational states of the vehicle and may provide entertainment and information to the user when the vehicle is parked and when the vehicle is being driven.

At 322, the method 300 optionally includes halting output of the first motor input command to the first traction motor. During evaluation of vehicle operating conditions at operation 314 of the method 300, it may be determined that the controller is outputting the first motor input command to the first traction motor. As described with respect to operation 318, one or more vibration and/or other tactile feedback patterns generated by the first traction motor using the second motor input command may be the same as or similar to vibration and/or other tactile feedback patterns generated by the first traction motor using the first motor input command. Generation of audio-based vibration using the first motor input command may be considered an entertainment element, whereas vibration generated in response to the second motor input command may provide information about an operational state of the vehicle. The second motor input command may, in some examples, take priority over the first motor input command. In these examples, the method 300 may include halting output of the first motor input command to the first traction motor when the second motor input command is output to the first traction motor.

At 324, the method 300 includes outputting the third motor input command to the first traction motor. The third motor input command may be a conventional command configured to drive the first traction motor to generate torque and provide rotational power to drive one or more wheels that are coupled to the first traction motor.

At 326, the method 300 optionally includes halting output of the second motor input command and/or the first motor input command to the first traction motor. During evaluation of vehicle operating conditions at operation 314 of the method 300, it may be determined that the controller is outputting the first motor input command and/or the second motor input command to the first traction motor. If the third motor input command is being output to the first traction motor to drive directional movement of the vehicle, the third motor input command may take precedence over the first motor input command. The method 300 may not output the first motor input command to the first traction motor, and the method 300 includes maintaining operating conditions (e.g., output the third motor input command to drive directional movement of the vehicle). In some examples, one or more of the first motor input command and the second motor input command may be output to the first traction motor prior to and/or when the third motor input command is output to the first traction motor. The first motor input command and/or the second motor input command may be output to a different traction motor than the first traction motor (e.g., the second traction motor, the auxiliary motor) to enable generation of vibration, pulse, movement, and so on, that corresponds to the respective motor input command while still enabling the third motor input command to be used to drive directional movement of the vehicle. The method 300 ends.

FIG. 4 shows a first distribution of motor torque 400 and a second distribution of motor torque 450 in a vehicle, such as the vehicle 100 of FIGS. 1-2. The first distribution of motor torque 400 may occur when a first traction motor and a second traction motor (e.g., the first traction motor 114 and the second traction motor 116 of FIG. 1) are positioned on a single axle (e.g., the rear axle of the axles 104 of the vehicle 100 of FIG. 1). As further described with respect to FIG. 7, the controller may command persistent torque (e.g., DC torque) to be applied to the first traction motor and/or the second traction motor based on the motor input command (e.g., the first motor input command, the second motor input command, and/or the third motor input command) to preload motor mounts, and further command fluctuating torque (e.g., AC torque) to be applied to the traction motors to generate vibration of the vehicle.

In the first distribution of motor torque 400, wheel torque is reacted by a corresponding body reaction torque. For example, wheels on the axle not having the first traction motor and the second traction motor positioned thereon (e.g., the front axle) may be locked to reduce directional vehicle motion during generation of vibration (e.g., such that the vehicle may not move from its stationary or parked position). In some embodiments, the method for generating vehicle vibration based on the motor input command, as further described with respect to FIG. 7, may include determining if a mu value (e.g., a value indicating friction between a wheel of the vehicle and a driving surface) is below a mu threshold. For example, the mu threshold may be a non-zero, positive value which indicates a friction level below which the vehicle may move when vibration is generated, even though the vehicle may be in a park mode (e.g., a park lock engaged). If the mu value is below the mu threshold, the method for generating vibration may be canceled. If the vehicle is in the park mode and the mu value is greater than or equal to the mu threshold, static torque may be provided to the wheels of the axle on which the first traction motor and the second traction motor are positioned. The static torque may overcome isolation and lash as well as generate desired shaking oscillation (e.g., vibration) of the vehicle. Reacted wheel torque, as shown by a first arrow 402, and static torque, as shown by a second arrow 404, may result in a vertical response of the vehicle, as shown by a third arrow 406, thus generating tactile motion of the vehicle which is synchronized with an audio signal and/or triggered by the vehicle tactile feedback signal (e.g., to generate a resultant vibrational force). For example, an axis system 420 is provided in FIG. 4 as well as FIG. 5, for reference. The z-axis may be a vertical axis (e.g., parallel to a direction of gravity), the y-axis may be a lateral axis (e.g., horizontal axis), and the x-axis may be a longitudinal axis, in one example. However, the axes may have other orientations, in other examples.

In the second distribution of motor torque 450, the first traction motor may be positioned on the front axle and the second traction motor may be positioned on the rear axle. Wheel torque on the rear axle from the second traction motor positioned thereon may be static to overcome isolation and lash, as well as provide desired shaking oscillation. A direction of wheel torque on the rear axle is indicated by a fourth arrow 408. Wheel torque on the front axle with the first traction motor positioned thereon may be equal in magnitude to wheel torque on the rear axle and in an opposite direction, as indicated by a fifth arrow 410. In this way, opposing wheel torque may generate vertical translation of the vehicle, as indicated by a sixth arrow 412. Vertical translation (e.g., vibration) of the vehicle generated when opposing wheel torque is generated by traction motors on different axles of the vehicle (e.g., the second distribution of motor torque) may have a greater magnitude than vibration generated by traction motors on the same axle (e.g., the first distribution of motor torque).

In some embodiments, distribution of motor torque may be different between traction motors positioned on different axles. For example, a first traction motor on a rear axle may have a greater maximum torque output and/or a higher bandwidth for torque than a second traction motor on a front axle. Different motor signals may be sent to the first traction motor and the second traction motor, such that the first traction motor generates more vertical translation (e.g., vibration) compared to the second traction motor. For example, as described with respect to the method 300 of FIGS. 3A-3B, the first motor input command used to generate vibration that corresponds to an audio signal may be output to the first traction motor, and the third motor input command used to drive rotation of wheels of the vehicle may be output to the second traction motor. In some embodiments where both the first traction motor and the second traction motor are positioned on the same axle (e.g., the first distribution of motor torque 400), a different amount of motor torque may be applied to each of the first traction motor and the second traction motor. Further, in some embodiments, an auxiliary motor may be coupled to a steering wheel to provide power steering. A motor signal may be sent to the auxiliary motor as well as to traction motors positioned on at least one axle of the vehicle, such that the steering wheel may also provide tactile energy (e.g., vibration) synchronous with audio signal.

Turning to FIG. 5, a third distribution of motor torque 500 is shown. As briefly described with respect to FIG. 1, in some embodiments, traction motors may be positioned on the front axle 104*a* to provide rotational power to the wheels of the front axle 104*a* and traction motors may further be positioned on the rear axle 104*b* to provide rotational power to the wheels of the rear axle 104*b*. The embodiment of the vehicle 100 shown in FIG. 5 includes the first traction motor 114 and the second traction motor 116 on the rear axle 104*b*. Additionally, the first dashed box 138 and the second dashed box 140 each represent an additional traction motor, for example, a third traction motor and a fourth traction motor, respectively, positioned on the front axle 104*a*. In some embodiments, the vehicle 100 may include three traction motors (e.g., a combination of three of the first traction motor 114, the second traction motor 116, the third traction motor as indicated by the first dashed box 138, and the fourth traction motor as indicated by the second dashed box 140). In other embodiments, the vehicle 100 includes the four traction motors described herein (e.g., the first traction motor 114, the second traction motor 116, the third traction motor as indicated by the first dashed box 138, and the fourth traction motor as indicated by the second dashed box 140). Both when the vehicle 100 is configured with three traction motors and configured with four traction motors, each of the three or four traction motors may be actuated using motor input signals which may result in vertical, lateral, and/or longitudinal vibrational forces (e.g., a resultant vibrational force) on the body of the vehicle 100. Each of the wheels 102 may be locked (e.g., the vehicle may be in a park mode with a park lock engaged) and different motor signals or the same motor signal (e.g., motor input command) may be sent to each of the three or four traction motors to generate vibration. In other examples, the wheels 102 may not be locked, and the vehicle may be in a drive mode. Different motor input commands may be sent to each of the three or four traction motors to generate vibration and/or to drive rotation of the wheels 102.

In the third distribution of motor torque 500, each of the four traction motors may be dedicated to a single wheel of the set of wheels 102. For example, the first traction motor 114 may be coupled to, and thus provide rotational power to a first wheel 102*a* of the set of wheels 102. The second traction motor 116 may be coupled to a second wheel 102*b*, the third traction motor (e.g., as indicated by the first dashed box 138) may be coupled to a third wheel 102*c*, and the fourth traction motor (e.g., as indicated by the second dashed box 140) may be coupled to a fourth wheel 102*d*.

A different motor input command may be sent to each of the four traction motors to impart vibration when each of the set of wheels 102 are locked (e.g., park lock applied to the axle and/or caliper applied to the wheel). The different motor input commands may be sent to each of the four traction motors out of phase, which may result in induced lateral vibration as well as vertical and/or longitudinal vibration (e.g., a resultant vibrational force). For example, a first motor input command applied to the first traction motor 114 and a third motor input command applied to the third traction motor (e.g., as indicated by the first dashed box 138) may command torque to be applied to a respective wheel in a first direction (e.g., a first rotational direction, such as clockwise), as indicated by a first curved arrow 522 and a third curved arrow 524, respectively. A second motor input command applied to the second traction motor 116 and a fourth motor input command applied to the fourth traction motor (e.g., as indicated by the second dashed box 140) may command torque to be applied to a respective wheel in a second direction different from the first direction (e.g., a second rotational direction, such as counterclockwise), as indicated by a second curved arrow 526 and a fourth curved arrow 528, respectively. The different directions of torque applied to the set of wheels 102 may impart vertical, lateral, and longitudinal vibration of the vehicle 100. As described with respect to the axis system 420, lateral vibration of the vehicle 100 may be vibration in a direction parallel with the y-axis, vertical vibration may be in a direction parallel with the z-axis, and longitudinal vibration may be in a direction parallel with the x-axis. In embodiments where the vehicle 100 is configured with three traction motors, as described above, three of the four motor input commands may be applied to respective traction motors of the vehicle 100 to induce vibration, as described herein. This distribution of torque to different wheels may include outputting the first motor input command to each of the wheels, outputting different configurations of the first motor input command to each of the wheels (e.g., different frequency, intensity, etc.), and/or outputting different types of motor input commands to each of the wheels (e.g., outputting the first motor input command to the first wheel 102*a*, outputting the second motor input command to the second wheel 102*b*, and so on).

FIG. 6 illustrates a method 600 for generating the first motor input command from an audio signal of an audio source, as briefly described with respect to FIGS. 3A-3B. The audio source may be a radio, video gaming console, or any other audio source which is part of an audio system of a vehicle, such as the audio system 232 of the vehicle 100 of FIGS. 1-2. Instructions for carrying out the method 600 and the rest of the methods included herein may be executed by a controller based on instructions (e.g., computer readable instructions) stored on memory of the controller and in conjunction with signals received from sensors of the vehicle control system, such as the sensors described above with reference to FIGS. 1-2. The controller may employ actuators of the vehicle control system to adjust traction motor operation, according to the methods described below.

At 602, the method 600 includes acquiring an audio signal from an audio source. The audio source may be a CD, DVD, AM/FM/Satellite radio, cloud streaming service, wired device, Bluetooth device, or other data transfer method of the audio system of the vehicle. The audio signal may be a purposeful notification signal, from video, music, podcasts, audio books, games, phone calls, vehicle chimes, notifications, and so on.

At 604, the method 600 includes evaluating vehicle operating conditions. Vehicle operating conditions may include various vehicle conditions (e.g., vehicle operating mode), various power source operating conditions (e.g., traction motor operating mode, engine operating mode), and various ambient conditions (e.g., temperature, barometric pressure, humidity, date, time, etc.). In addition to power source operating conditions, fuel system conditions may also be monitored, such as batter charge state for a battery coupled to the traction motor. Operating conditions may be measured by one or more sensors coupled to a controller, such as sensors of the sensor subsystem 210. Vehicle operating conditions further include determining what, if any, motor input commands are being output to one or more traction motors of the vehicle.

At 606, the method 600 includes determining if the third motor input command is being output to the first traction motor. The third motor input command may be used by the first traction motor to drive rotation of one or more wheels of the vehicle. Thus, if the third motor input command is output to the first traction motor when the vehicle is in a drive mode (e.g., the park lock is not engaged), the third motor input command may drive the vehicle. In some examples, it may not be acceptable to have tactile energy generation from the first traction motor directed to audio and/or vehicle tactile feedback signals when the first traction motor is being used to drive the vehicle. For example, using the first traction motor to generated vehicle vibration that corresponds with an audio signal and using the first traction motor to drive the vehicle may reduce an amount of torque and/or that may be used to drive the vehicle.

In the example of FIG. 6, in response to determining that the third motor input command is being output to the first traction motor, the method 600 proceeds to 608. At 608, the method 600 includes maintaining vehicle operating conditions. The audio signal may not be processed and the first motor input command may not be generated. The method 600 ends.

Returning to 606, if it is determined that the third motor input command is not being output to the first traction motor, the method 600 proceeds to 610. At 610, the method 600 includes processing the audio signal. The audio signal may be processed using a low-pass filter with a cutoff frequency. The cutoff frequency may be approximately 50 Hz, in some embodiments. In other embodiments, the cutoff frequency may be greater than or less than 50 Hz. Additionally or alternatively, the audio signal may be processed with a band-pass filter. When the audio signal is processed using the band-pass filter, signals of the audio signal having frequencies within a given range are passed through the filter and signals with frequencies outside of the given range are attenuated. For example, the given range may be between 0 Hz and 50 Hz.

At 612, the method 600 includes determining if a decibel level of the processed audio signal is greater than a decibel threshold. If the decibel level is not greater than decibel threshold, the method 600 returns to operation 602 to acquire audio signal from the audio source without generating a motor input command for the present audio signal. In some embodiments, the decibel threshold may be a non-zero, positive value equivalent to the cutoff frequency of the low-pass filter and/or the given range of the band-pass filter, and a motor input command may be generated for all signals of the audio signal which pass through the respective filter. Alternatively, the decibel threshold may be separate from the low-pass filter and/or the band-pass filter. For example, the decibel threshold may be a non-zero, positive decibel level above which the audio signal is loud and/or significant enough to be heard by a user in the cabin of the vehicle.

If the audio signal is greater than the decibel threshold, at 614 the method 600 includes generating a first motor input command based on the processed audio signal to be sent to the traction motors. In some embodiments, at 616, the method 600 includes generating the motor input command using frequency content of the processed audio signal. For example, the first motor input command may be a waveform similar to that of the audio signal from which the first motor input command is generated. When the first motor input command is generated in this way, an intensity of vehicle vibration (e.g., lower-frequency tactile energy generated by the traction motors) may correspond with an intensity (e.g., volume) of the audio signal. Generating the first motor input command using frequency content of the processed audio signal may include additional processing of the audio signal. For example, additional processing may include determining frequency-dependent amplitude of the first motor input command (e.g., an intensity of the vibration), band-pass filtering specific frequencies aligning with known vehicle modes, phase shifting select frequencies to create a more realistic response, and so on. For example, generating a more realistic response may include generating a first motor input command having a first tactile energy profile for a first traction motor positioned on a first axle of the vehicle and generating a first motor input command having a second tactile energy profile, different from the first tactile energy profile, for a second traction motor positioned on a second axle of the vehicle. The first tactile energy profile may generate a more frequent and/or more intense vibration of the vehicle, compared to the second tactile energy profile. This may be implemented when distribution of the audio signal (e.g., via speakers, as described with respect to FIG. 2) is distributed such that different audio signals are output via speakers in different locations around the cabin. The first motor input command for the first axle may generate a first intensity and/or frequency of vibration at a front of the vehicle when the first axle is the front axle, and the first motor input command for the second axle may generate a second intensity and/or frequency of vibration at a rear of the vehicle when the second axle is the rear axle. The different intensities and/or frequencies generated in different regions of the vehicle may correspond with distribution of the audio signals.

In other embodiments, at 618, the method 600 may include generating motor input command using arbitrary and/or pre-determined frequency content. In these embodiments, the processed audio signal may act as a trigger, such that generation of the first motor input command is triggered when the processed audio signal exceeds a trigger threshold. For example, the trigger threshold may be a non-zero, positive desired low frequency energy amplitude, such as audio signals which are greater than 70-80 dB (unweighted) in a given frequency range. The first motor input command may be a signal comprised of a small number of frequencies or a purposefully shaped spectral content, in some embodiments. The pre-determined frequency content may be pre-determined shaped spectral content. Generation of the first motor input command using frequency content of the processed audio signal or using arbitrary and/or pre-determined frequency content may be selected by a user, determined by a controller based on an audio source generating the audio signal, and so on.

At 620, the method 600 include sending the first motor input command to be input by the traction motors. For example, the first motor input command generated by the method 600 may be output by the in-vehicle computing system 200 of FIG. 2 and be received by the vehicle control system 230, which may command torque distribution to the first traction motor and/or the second traction motor according to the motor input command. The method 600 may be continuously implemented, wherein audio signals are processed in real time such that corresponding vibration of the vehicle based on generated motor input command occurs synchronously with output of the audio signal (e.g., from speakers in a cabin of the vehicle). The method 600 ends.

At 622, the method 600 optionally includes determining if the second motor input command is being output to the first traction motor. The second motor input command may be used by the first traction motor to generate tactile feedback (e.g., vibration, pulse, etc.) in one or more parts of the vehicle. The second motor input command may be generated in response to the vehicle tactile feedback signal, which may provide supplemental tactile energy to the vehicle, such as simulating a pre-recorded drive route. Generation of audio-based vibration using the first motor input command may be considered an entertainment element, and the first motor input command may, in some examples, take priority over the second motor input command.

In the example of FIG. 6, in response to determining that the second motor input command is not being output to the first traction motor, the method 600 proceeds to 608. At 608, the method 600 includes maintaining vehicle operating conditions. The first motor input command may be generated and sent to be input by one or more traction motors. The method 600 ends.

Returning to 622, if it is determined that the second motor input command is being output to the first traction motor, the method 600 optionally proceeds to 624. At 624, the method 600 includes halting output of the second motor input command to the first traction motor. This may halt generation of tactile energy by the first traction motor that corresponds to the vehicle tactile feedback signal. The method 600 ends.

Turning now to FIG. 7, a method 700 is illustrated for generating lower-frequency tactile motion (e.g., vibration) of a vehicle by implementing the first motor input command at the traction motor(s). At 702, the method 700 includes receiving the first motor input command. In some embodiments, the first motor input command may be generated by the in-vehicle computing system 200 (e.g., of FIG. 2) and sent to the vehicle control system 230 to be implemented, as described with respect to FIGS. 3 and 6.

At 704, the method 700 includes determining if the vehicle is in a park mode. For example, the vehicle may be determined to be in the park mode when each wheel hub is held in a position to resist torque input. For example, a service lock, a parking lock, a wheel caliper (e.g., 110 described with respect to FIG. 1) and so on may be engaged. Engagement of the park mode may advantageously reduce translational motion of the vehicle (e.g., where the wheels rotate and the vehicle moves in a forward or reverse direction) when vibration of the vehicle is generated. If vehicle is not in park mode, the method 700 may proceed to 706, where the method 700 include maintaining a vehicle operating condition. The first traction motor may not implement the first motor input command to generate vibration that corresponds to the audio signal. The method 700 may end.

If the vehicle is in the park mode, at 708 the method 700 includes applying persistent torque (e.g., DC torque) to preload motor mounts of the traction motor(s) which are to generate vibration in subsequent operations of the method 700. For example, a first motor mount of the first traction motor on the rear axle may have persistent torque applied thereto, which may eliminate lash in the drivetrain. Additionally or alternatively, a second motor mount of the second traction motor on the rear axle or on the front axle may have persistent torque applied thereto. A level of persistent torque applied may be 15-45 Newton-meter (Nm).

At 710, the method 700 optionally includes receiving the second motor input command. For example, during execution of the method 700, a method for generating and outputting the second motor input command in response to receiving the vehicle tactile feedback signal (e.g., the method 300 of FIGS. 3A-3B) may be executed. The second motor input command may be output to the same traction motor (e.g., the first traction motor) that is being driven using the method 700, as further described herein.

Following preloading of the motor mount(s), at 712 the method 700 includes applying fluctuating torque to the traction motor(s) based on the motor input command(s). Traction motors may be positioned on the same axle or on different axles of the drivetrain. Both when the traction motors are positioned on the same axle and when the traction motors are positioned on different axles, the motor input command used to command actuation of each traction motor may be the same or may be different. For example, the first motor input command may be applied to both the first traction motor and the second traction motor, both of which are positioned on the rear axle. The first motor input command may be applied such that an amount of fluctuating torque commanded by the first motor input command is applied to each of the first traction motor and the second traction motor. Alternatively, the amount of fluctuating torque commanded by the first motor input command may be divided equally between and applied to the first traction motor and the second traction motor. In some embodiments, when the second motor input command is received at 710, the second motor input command may be applied to the first traction motor in addition to application of the first motor input command, and/or applied to the second traction motor. These scenarios may also be implemented when the first traction motor and the second traction motor are positioned on different axles. For example, the same motor input command may be applied to each of the first traction motor and the second traction motor to command a same amount of fluctuating torque. In embodiments where the first traction motor and the second traction motor are symmetric (e.g., having similar operational speed and torque ranges), application of the same motor input command may result in the same traction motor output (e.g., intensity and/or frequency of vibration) for each of the first traction motor and the second traction motor. In embodiments where the first traction motor and the second traction motor are asymmetric (e.g., having different speed and torque outputs), application of the same motor input command may result in different motor outputs for each traction motor. Different motor input commands may be applied to each traction motor to generate the same output among the traction motors, or to generate different outputs, as may be desired by a user or directed by a control system. For example, the first traction motor may drive vibration of the vehicle that corresponds with an audio signal, and the second traction motor may drive vibration of the vehicle that corresponds with a change in vehicle behavior (e.g., to indicate a door is locked).

The first motor input command may be generated based on frequency content of the audio signal or based on arbitrary and/or pre-determined frequency content. At 714, the method 700 may include applying fluctuating torque to the traction motor, wherein fluctuating torque represents frequency content of the audio signal. Operation 714 may be implemented when the motor input command is generated based on frequency content of the audio signal. At 716, the method 700 may include applying fluctuating torque to the traction motor, wherein fluctuating torque represents an arbitrary frequency signature. Operation 716 may be implemented when the motor input command is generated based on an arbitrary and/or pre-determined frequency content, where the audio signal is used as a trigger for generating the motor input command. At 718, the method 700 may optionally include applying fluctuating torque to the traction motor, wherein fluctuating torque represents the vehicle tactile feedback signal. For vehicles with traction motors on the front and rear axles, persistent torque and fluctuating torque for a first traction motor and persistent torque and fluctuating torque for a second traction motor may be applied in opposite directions to create a resultant vertical vibrational force. This may result in vertical translation (e.g., vibration along the z-axis, with respect to axis system 420).

At 720, the method 700 includes adjusting vibration based on user input. For example, an intensity and/or frequency of vehicle vibration may be adjusted by a user, for example, through in-vehicle controls or out-of-vehicle controls (e.g., phone app, web, and so on). Adjusting vibration may include adjusting fluctuating torque applied to at least one of the traction motors. A user input may select one or more types of motor input commands to implement at the traction motor. For example, the user input may select vibration based on audio signals (e.g., implementation of the first motor input command) and may not select vibration based on vehicle tactile feedback signals (e.g., implementation of the second motor input command).

Fluctuating torque may be applied as long as a motor input command is sent to motor(s). For example, the first motor input command may be received which corresponds to a first audio signal. During or following receipt of the first motor input command, the controller may receive the second motor input command or may not receive an additional motor input command. At 722, if the controller continues to receive a motor input command, the method 700 returns to operation 708 to apply fluctuating torque to the traction motors based on the motor input command and generate corresponding lower-frequency tactile energy (e.g., vibration). If it is determined at 722 that the controller does not receive a motor input command (e.g., the first motor input command is halted and a subsequent motor input command is not received) the method 700 proceeds to 724. At 724, the method 700 includes halting torque output by the traction motor, and vibration of the vehicle halts. The method 700 ends.

FIG. 8 shows a timing diagram 800 illustrating generation and output of motor input commands in response to receiving different signals, and corresponding power output of traction motors as driven by the motor input commands. The timing diagram 800 shows operation of a vehicle (e.g., the vehicle 100 of FIGS. 1-2) during execution of a method for generating tactile energy in a vehicle system (e.g., the method 300 of FIG. 3). Elements of the timing diagram 800 include a first plot 802 illustrating receipt of an audio signal by a controller of the vehicle, a second plot 804 illustrating receipt of a vehicle tactile feedback signal by the controller of the vehicle, and a third plot 806 illustrating receipt of a drive signal by the controller of the vehicle. The timing diagram 800 further includes a fourth plot 808 illustrating output of a first motor input command, a fifth plot 810 illustrating output of a second motor input command, and a sixth plot 812 illustrating output of a third motor input command. A seventh plot 814 shows tactile energy output of a first traction motor, and an eighth plot 816 shows tactile energy of a second traction motor. Time is shown as increasing from left to right along a horizontal axis. Tactile energy output by the first traction motor and the second traction motor increases from zero along a vertical axis.

At t0, an audio signal is received by the controller of the vehicle. Between t0 and t1, a first motor input command is generated in response to receiving the audio signal. At t1, the first motor input command is output to the first traction motor. Upon receiving the first motor input command, at t1, the first traction motor generates and outputs tactile energy, such as vibration of one or more parts of the vehicle that corresponds with the audio signal. The second traction motor is not receiving a motor input command, and is not generating and/or outputting tactile energy. The controller of the vehicle is not receiving a vehicle tactile feedback signal and/or a drive signal prior to t2. The controller is therefore not generating and/or outputting a second motor input command or a third motor input command prior to t2.

The controller may continue to receive the audio signal and output the first motor input command at t2. At t2, a vehicle tactile feedback signal is received by the controller of the vehicle. Between t2 and t3, a second motor input command is generated in response to receiving the vehicle tactile feedback signal. At t3, the second motor input command is output to the first traction motor. The first traction motor generates and outputs tactile energy, such as vibration of a door handle indicating that doors of the vehicle are locked. Tactile energy output by the first traction motor in response to the second motor input command may be different (e.g., greater intensity, greater frequency, etc.) from tactile energy output by the first traction motor in response to the first motor input command. At t3, output of the first motor input command to the first traction motor is halted. The controller may continue to receive the audio signal, however the second motor input command may take priority over the first motor input command, and output of the second motor input command to the first traction motor may halt output of the first motor input command to the first traction motor. The second traction motor is not receiving a motor input command, and is not generating and/or outputting tactile energy.

At t4, a drive signal is received by the controller of the vehicle. The controller may continue to receive the vehicle tactile feedback signal and output the second motor input command to the first traction motor at t4. The controller may also receive the audio signal, however as described above the second motor input command may take priority over the first motor input command, and the first motor input command may not be output to the first traction motor. Between t4 and t5, a third motor input command is generated in response to receiving the drive signal.

At t5, the third motor input command is output to the first traction motor. At t5, the vehicle tactile feedback signal is not received by the controller, and output of the second motor input command to the first motor traction motor is halted. The first motor input command may be generated and output to the second traction motor to drive generation and output of tactile energy by the second traction motor in response to receiving the audio signal. In this way, tactile energy that corresponds to the audio signal may be output by the second traction motor while directional motion of the vehicle is being driven by the first traction motor, using the third motor input command.

In this way, a method for generating vibration of the vehicle system (e.g., lower-frequency tactile energy) may be provided in response to different types of signals received by the vehicle, including audio signals into a cabin of the vehicle and vehicle tactile feedback signals from sensors and/or external devices communicably coupled to the vehicle. Vibration may be provided for the vehicle system, as opposed to localized regions of the vehicle, such as a designated passenger location. Additionally, vibration may be provided using existing vehicle and drivetrain elements, such that additional elements may not be added to the vehicle, conserving a weight, footprint, and resources of the vibration generating system. User experience may be enhanced when listening to music, watching a video, playing a video game, and engaging with other audio sources which are connected to the audio system and of the vehicle and selected to use the vibration generation method. User experiences may be further enhanced during stationary and dynamic operation of the vehicle.

The technical effect of generating vibration based on audio signals, drive signals, and/or vehicle tactile feedback signals using traction motors of a vehicle is providing lower-frequency tactile energy without addition of auxiliary elements to the drivetrain.

The disclosure also provides support for a method, comprising: acquiring an audio signal from an audio source and, responsive to acquiring the audio signal, generating a first motor input command for a first traction motor driving a wheel of a vehicle system, acquiring a vehicle tactile feedback signal from the vehicle system and, responsive to acquiring the vehicle tactile feedback signal, generating a second motor input command for the first traction motor, acquiring a drive signal from a controller of a vehicle and, responsive to acquiring the drive signal, generating a third motor input command for the first traction motor, and outputting one or more of the first motor input command, the second motor input command, and the third motor input command to the first traction motor. In a first example of the method, the first motor input command is configured to drive the first traction motor to provide low-frequency tactile energy to a body of the vehicle when the vehicle is stationary. In a second example of the method, optionally including the first example, the second motor input command is configured to drive the first traction motor to provide tactile feedback to a body of the vehicle in response to a vehicle condition. In a third example of the method, optionally including one or both of the first and second examples, the third motor input command is configured to drive the first traction motor to drive rotation of the wheel of the vehicle system. In a fourth example of the method, optionally including one or more or each of the first through third examples, the method further comprises: evaluating vehicle operating conditions. In a fifth example of the method, optionally including one or more or each of the first through fourth examples, the method further comprises: outputting the first motor input command to the first traction motor in response to determining that the vehicle is in a park mode. In a sixth example of the method, optionally including one or more or each of the first through fifth examples, outputting the first motor input command includes halting output of the second motor input command. In a seventh example of the method, optionally including one or more or each of the first through sixth examples, the method further comprises: outputting the second motor input command to the first traction motor in response to determining that the vehicle is in a park mode and/or a drive mode. In an eighth example of the method, optionally including one or more or each of the first through seventh examples, outputting the second motor input command includes halting output of the first motor input command to the first traction motor. In a ninth example of the method, optionally including one or more or each of the first through eighth examples, the method further comprises: outputting the third motor input command to the first traction motor in response to determining that the vehicle is in a drive mode. In a tenth example of the method, optionally including one or more or each of the first through ninth examples, outputting the third motor input command includes halting output of the first motor input command and/or halting output of the second motor input command.

The disclosure also provides support for a method, comprising: acquiring an audio signal from an audio source and, responsive to acquiring the audio signal, generating a first motor input command for a first traction motor driving a wheel of a vehicle system, acquiring a vehicle tactile feedback signal from the vehicle system and, responsive to acquiring the vehicle tactile feedback signal, generating a second motor input command for the first traction motor and halting generation of the first motor input command, and acquiring a drive signal from a controller of a vehicle and, responsive to acquiring the drive signal, generating a third motor input command for the first traction motor. In a first example of the method, the method further comprises: determining a signal type of the vehicle tactile feedback signal, responsive to the vehicle tactile feedback signal being a first type, generating and outputting the third motor input command, and responsive to the vehicle tactile feedback signal being a second type, halting generation and output of the third motor input command. In a second example of the method, optionally including the first example, generating the first motor input command includes generating a tactile energy profile using frequency content of a processed audio signal. In a third example of the method, optionally including one or both of the first and second examples, generating the first motor input command includes generating a tactile energy profile using arbitrary and/or pre-determined frequency content. In a fourth example of the method, optionally including one or more or each of the first through third examples, generating and outputting the third motor input command further comprises halting generation and output of the first motor input command and the second motor input command.

The disclosure also provides support for a vehicle system, comprising: a traction motor configured to drive a wheel of a vehicle system, and a controller with computer readable instructions that, when executed, cause the controller to: acquire an audio signal from an audio source and, responsive to acquiring the audio signal, generate a first motor input command for the traction motor, acquire a vehicle tactile feedback signal from the vehicle system and, responsive to acquiring the vehicle tactile feedback signal, generating a second motor input command for the traction motor, and acquire a drive signal and, responsive to acquiring the drive signal, generating a third motor input command for the traction motor. In a first example of the system, the system further comprises: a second traction motor configured to drive a second wheel of the vehicle system. In a second example of the system, optionally including the first example, the instructions are configured to output the first motor input command to the traction motor and to the second traction motor. In a third example of the system, optionally including one or both of the first and second examples, the instructions are configured to output the first motor input command to the traction motor and to output the second motor input command to the second traction motor.

Note that the example control and estimation routines included herein can be used with various engine, electric motors, and/or vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the vehicle control system, where the described actions are carried out by executing the instructions in a system including the various vehicle hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

acquiring an audio signal from an audio source and, responsive to acquiring the audio signal, generating a first motor input command for a first traction motor driving a wheel of a vehicle system;

acquiring a vehicle tactile feedback signal from the vehicle system and, responsive to acquiring the vehicle tactile feedback signal, generating a second motor input command for the first traction motor;

acquiring a drive signal from a controller of a vehicle and, responsive to acquiring the drive signal, generating a third motor input command for the first traction motor; and outputting one or more of the first motor input command, the second motor input command, and the third motor input command to the first traction motor, wherein the first motor input command is configured to drive the first traction motor to provide low-frequency tactile energy to a body of the vehicle when the vehicle is stationary.

2. The method of claim 1, wherein the second motor input command is configured to drive the first traction motor to provide tactile feedback to a body of the vehicle in response to a vehicle condition.

3. The method of claim 1, wherein the third motor input command is configured to drive the first traction motor to drive rotation of the wheel of the vehicle system.

4. The method of claim 1, further comprising evaluating vehicle operating conditions.

5. The method of claim 4, further comprising outputting the first motor input command to the first traction motor in response to determining that the vehicle is in a park mode.

6. The method of claim 5, wherein outputting the first motor input command includes halting output of the second motor input command.

7. The method of claim 4, further comprising outputting the second motor input command to the first traction motor in response to determining that the vehicle is in a park mode and/or a drive mode.

8. The method of claim 7, wherein outputting the second motor input command includes halting output of the first motor input command to the first traction motor.

9. The method of claim 4, further comprising outputting the third motor input command to the first traction motor in response to determining that the vehicle is in a drive mode.

10. The method of claim 9, wherein outputting the third motor input command includes halting output of the first motor input command and/or halting output of the second motor input command.

11. A method, comprising:

acquiring an audio signal from an audio source and, responsive to acquiring the audio signal, generating a first motor input command for a first traction motor driving a wheel of a vehicle system;

acquiring a vehicle tactile feedback signal from the vehicle system and, responsive to acquiring the vehicle tactile feedback signal, generating a second motor input command for the first traction motor;

acquiring a drive signal from a controller of a vehicle and, responsive to acquiring the drive signal, generating a third motor input command for the first traction motor; and outputting one or more of the first motor input command, the second motor input command, and the third motor input command to the first traction motor, wherein the second motor input command is configured to drive the first traction motor to provide tactile feedback to a body of the vehicle in response to a vehicle condition.

12. The method of claim 11, wherein the third motor input command is configured to drive the first traction motor to drive rotation of the wheel of the vehicle system.

13. The method of claim 11, further comprising evaluating vehicle operating conditions.

14. The method of claim 13, further comprising outputting the second motor input command to the first traction motor in response to determining that the vehicle is in a park mode and/or a drive mode.

15. The method of claim 13, further comprising outputting the third motor input command to the first traction motor in response to determining that the vehicle is in a drive mode.

16. The method of claim 15, wherein outputting the third motor input command includes halting output of the first motor input command and/or halting output of the second motor input command.

17. A method, comprising:

acquiring an audio signal from an audio source and, responsive to acquiring the audio signal, generating a first motor input command for a first traction motor driving a wheel of a vehicle system;

acquiring a vehicle tactile feedback signal from the vehicle system and, responsive to acquiring the vehicle tactile feedback signal, generating a second motor input command for the first traction motor;

acquiring a drive signal from a controller of a vehicle and, responsive to acquiring the drive signal, generating a third motor input command for the first traction motor;

outputting one or more of the first motor input command, the second motor input command, and the third motor input command to the first traction motor;

evaluating vehicle operating conditions; and outputting the first motor input command to the first traction motor in response to determining that the vehicle is in a park mode.

18. The method of claim 17, wherein outputting the first motor input command includes halting output of the second motor input command.

19. The method of claim 17, wherein the third motor input command is configured to drive the first traction motor to drive rotation of the wheel of the vehicle system.

20. The method of claim 17, further comprising outputting the third motor input command to the first traction motor in response to determining that the vehicle is in a drive mode.

* * * * *